US008803802B2

(12) United States Patent
Hatanaka et al.

(10) Patent No.: US 8,803,802 B2
(45) Date of Patent: Aug. 12, 2014

(54) INPUT DEVICE PROVIDING TACTILE FEELING ACCORDING TO USER OPERATION

(75) Inventors: Shinji Hatanaka, Okazaki (JP); Nozomi Kitagawa, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 780 days.

(21) Appl. No.: 12/926,753

(22) Filed: Dec. 8, 2010

(65) Prior Publication Data

US 2011/0140818 A1 Jun. 16, 2011

(30) Foreign Application Priority Data

Dec. 11, 2009 (JP) ................................ 2009-281870

(51) Int. Cl.
*G06F 3/033* (2013.01)
*G09G 5/08* (2006.01)

(52) U.S. Cl.
USPC .......................................................... 345/161

(58) Field of Classification Search
USPC .................. 345/156, 157, 158, 161; 335/209; 702/105; 463/36, 38
See application file for complete search history.

(56) References Cited

U.S. PATENT DOCUMENTS 5,883,346 A * 3/1999 Stocken ............................ 200/4
6,373,465 B2 * 4/2002 Jolly et al. ..................... 345/156
6,468,158 B1 10/2002 Ootori et al.
6,480,752 B1 * 11/2002 Blume et al. ..................... 700/56
6,747,631 B1 6/2004 Sakamaki et al.
7,019,238 B2 * 3/2006 Kobayashi .................... 200/310
7,176,892 B2 2/2007 Kobayashi
7,683,748 B2 * 3/2010 Ruettiger ...................... 335/205
2004/0059245 A1 3/2004 Watanabe et al.
2005/0162389 A1 * 7/2005 Obermeyer et al. .......... 345/161
2005/0180082 A1 8/2005 Nakamura et al.
2007/0139375 A1 * 6/2007 Rosenberg et al. ........... 345/161
2008/0227547 A1 * 9/2008 Nourry ........................... 463/38

FOREIGN PATENT DOCUMENTS

JP A-2000-339051 12/2000
JP A-2004-136101 5/2004
JP B2-4295559 1/2005
JP B2-4289960 4/2005

OTHER PUBLICATIONS

Office Action mailed Jul. 9, 2013 in the corresponding JP application No. 2009-281870 (English translation).
Office Action mailed Feb. 26, 2013 in corresponding JP Application No. 2009-281870 (and English translation).

* cited by examiner

*Primary Examiner* — Quan-Zhen Wang
*Assistant Examiner* — Calvin C Ma
(74) *Attorney, Agent, or Firm* — Posz Law Group, PLC

(57) ABSTRACT

An input device includes an operating member, a restoring force generating part for automatically returning the operating member to a stationary position, a detector for detecting an operation state of the operating member, an actuator for applying an external force to the operating member and a controller for controlling the actuator. The operating member is displaceable in directions along a XY plane including an X axis and a Y axis and rotatable about a Z axis. The actuator includes a first magnet, a second magnet and an electromagnet having a core and a coil. One of the electromagnet and the first and second magnets is integrated with the operating member. At least in a stationary condition, the first magnet and the second magnet are located on opposite sides of an axis of rotation of the operating member, and are opposed to end surfaces of the core across predetermined clearances, respectively.

12 Claims, 10 Drawing Sheets

INPUT DEVICE PROVIDING TACTILE FEELING ACCORDING TO USER OPERATION

CROSS REFERENCE TO RELATED APPLICATION

This application is based on Japanese Patent Application No. 2009-281870 filed on Dec. 11, 2009, the disclosure of which is incorporated herein by reference.

FIELD OF THE INVENTION

The present invention relates to an input device having an operating member to be operated by a user. More particularly, the present invention relates to an input device having an operating member that is supported to be displaceable in arbitrary directions along an XY plane including a X axis and a Y axis and rotatable about a Z axis from a stationary position, and is capable of providing the user with a tactile feeling according to an operation condition by the user.

BACKGROUND OF THE INVENTION

An input device for inputting information to a remote electronic device, such as a display device, has been proposed. The input device has an operating member to be operated by a user. For example, the input device is employed to move a cursor such as a pointer on a display screen of the display device. The cursor can be moved in association with an operation of the operating member.

In such an input device, an operating member is, for example, supported to be movable in arbitrary directions along a XY plane including an X axis and a Y axis and rotatable about a Z axis. Further, it has been proposed to support the operating member so that a tactile feeling is provided in accordance with an operation condition of the operating member so as to improve user's confirmation of the operation.

In order to make such an input device compact and reduce manufacturing costs, an input device using an electromagnetic force has been proposed. For example, a haptic input device described in U.S. Pat. No. 7,176,892 (corresponding to JP3934394B2) includes: a supporting member having a spherical bearing; a lever handle having a spherical portion to be supported by the spherical bearing; an electromagnetic coil arranged to oppose a lower end surface of the lever handle; a detecting unit for detecting an operating state of the lever handle; and a control unit for receiving a signal from the detecting unit and outputting a driving signal of the electromagnetic coil based on the signal of the detecting unit. The lever handle is rockably and rotationally mounted to the supporting member.

The lower end surface of the lever handle is spherical. A magnetic plate is provided entirely along the spherical end surface of the lever handle through a lead spring. The electromagnetic coil is arranged to oppose the magnetic plate when the lever handle is at the stationary position, that is, when the lever handle is not displaced. The electromagnetic coil and a lining material provided on an upper surface of the electromagnetic coil cooperate with the magnetic plate to constitute an electromagnetic brake.

In the haptic input device described in U.S. Pat. No. 7,176,892, a feeling of resistance that varies in intensity depending upon the amount of rotation is applied to the lever handle.

Thus, the user can learn by blind touch whether or not the lever handle has been rotationally operated by the intended amount of rotation.

In U.S. Pat. No. 7,176,892, however, the operation thereof is not described in detail. Further, the electromagnetic coil is provided in the form of ring. Thus, when the lever handle is at the stationary position, the electromagnetic coil is opposed to a peripheral area of the magnetic plate. In other words, it appears that the electromagnetic coil is still opposed to the magnetic plate even if the lever handle is rotated, and an opposing area between the ring-shaped electromagnetic coil and the magnetic plate does not change.

Thus, as the amount of rotation is increased, an attracting magnetic force (Coulomb force) exerted between the electromagnetic coil and the magnetic plate is increased by increasing an electric current (driving signal) passing through the electromagnetic coil, thereby to strongly urge the spherical end surface of the lever handle to the spherical bearing of the supporting member. It is surmised that the resistance against the rotational motion is increased by such a structure.

To provide a user with a favorable tactile feeling, that is, to improve the confirmation of the operation, it is has been proposed to apply an external force to the operating member in a direction along a direction of displacement (operating direction). For example, if an external force is applied in the direction of the displacement, an acceleration feeling is provided. If an external force is applied in a direction opposite to the direction of the displacement, a brake feeling is provided. Preferably, the external force in the direction opposite to the direction of displacement is applied.

In the haptic input device of U.S. Pat. No. 7,176,892, the tactile feeling of the lever handle is provided by the attracting magnetic force (Coulomb force) exerted in a direction along the axis of rotation of the lever handle. That is, the external force is applied in a direction perpendicular to the direction of rotation, not in a direction along the direction of rotation. Therefore, it may be difficult to provide the tactile feeling. To provide a favorable tactile feeling, that is, to improve the confirmation of the operation in such a case, it is necessary to increase the resistance by increasing the electric current passing through the electromagnet.

SUMMARY OF THE INVENTION

It is an object of the present invention to provide an input device capable of providing a user's hand with a tactile feeling using a magnetic force, thereby improving confirmation of operation.

According to an aspect of the present invention, an input device includes an operating member, a restoring force generating part, a detector, an actuator and a controller. The operating member is a member to be operated by a user. The operating member is supported to be displaceable in directions along a XY plane including an X axis and a Y axis relative to a stationary position defined at an intersection of the X axis and the Y axis and rotatable about a Z axis. The restoring force generating part is configured to generate a force to automatically return the operating member to the stationary position. The detector is configured to detect an operation state of the operating member. The actuator is configured to apply an external force to the operating member. The actuator includes an electromagnet, a first magnet and a second magnet. The electromagnet has a core made of a magnetic material and a coil integrated with the core. The controller is configured to control an electric current to the coil in accordance with a detection result of the detector, thereby to control an operation of the actuator.

Further, one of the electromagnet and the first and second magnets is integrated with the operating member. At least in a stationary condition where the operating member is at the stationary position, the first magnet and the second magnet are located on opposite sides of an axis of rotation of the operating member. The first magnet has a first opposed surface defining one of magnetic poles. The second magnet has a second opposed surface defining one of magnetic poles. In the stationary condition, the first opposed surface and the second opposed surface are opposed to a first end surface and a second end surface of the core across predetermined clearances, respectively.

In the above structure, when the coil is energized, the core is magnetized by a magnetic field produced by the electric current passing through the coil. Thus, magnetic forces are produced between the first end surface of the core and the first opposed surface of the first magnet and between the second end surface of the core and the second opposed surface of the second magnet. The external force is applied to the operating member in a direction along an operation direction utilizing the magnetic forces. Accordingly, the user operating the operating member experiences a tactile feeling and easily confirms his/her operation.

In addition, the first magnet and the second magnet are located on opposite sides of the axis of rotation of the operating member. Therefore, when the operating member is rotated about the Z axis, the external force is applied to the operating member in a direction along a direction of rotation utilizing the magnetic forces produced on the opposite sides of the axis of rotation of the operating member. For example, in a case where the external force is applied to the operating member in a direction opposite to the direction of rotation, a brake feeling is provided. Accordingly, the confirmation of the operation improves also in the rotational operation.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Hereinafter, embodiments of the present invention will be described with reference to the drawings.

First Embodiment

An input device 10 according to the first embodiment is characterized by arrangement between magnets and electromagnets to which a magnetic force exerted.

Figure 1:
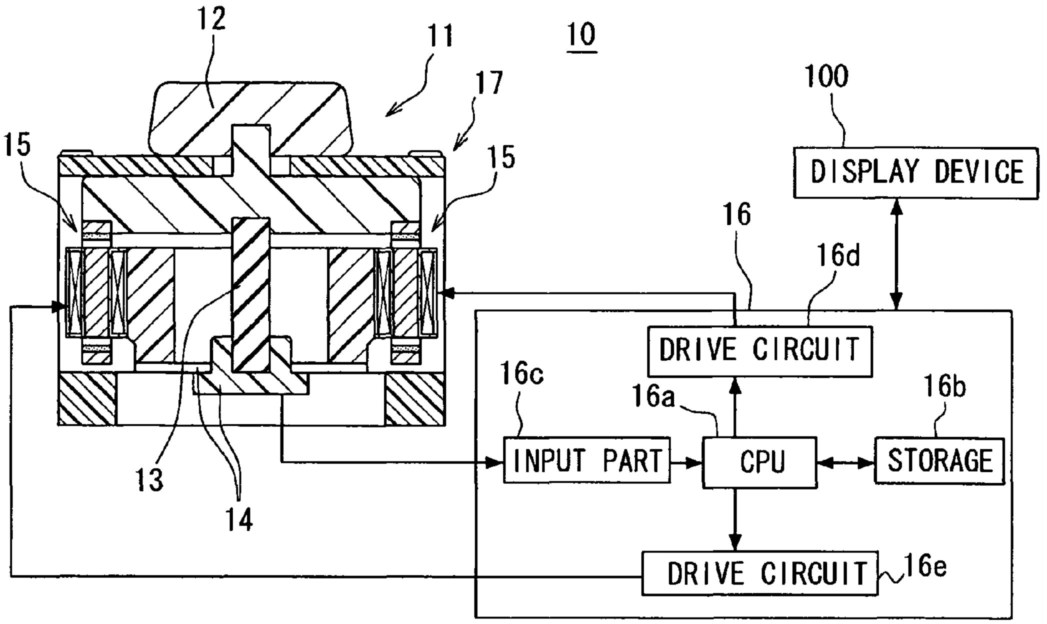
FIG. 1 is a schematic diagram of an input device according to a first embodiment of the present invention.

Referring to FIG. 1, the input device 10 is provided as a device for feeding information to an electronic device such as a display device 100 for a vehicle navigation system.

Figure 7:
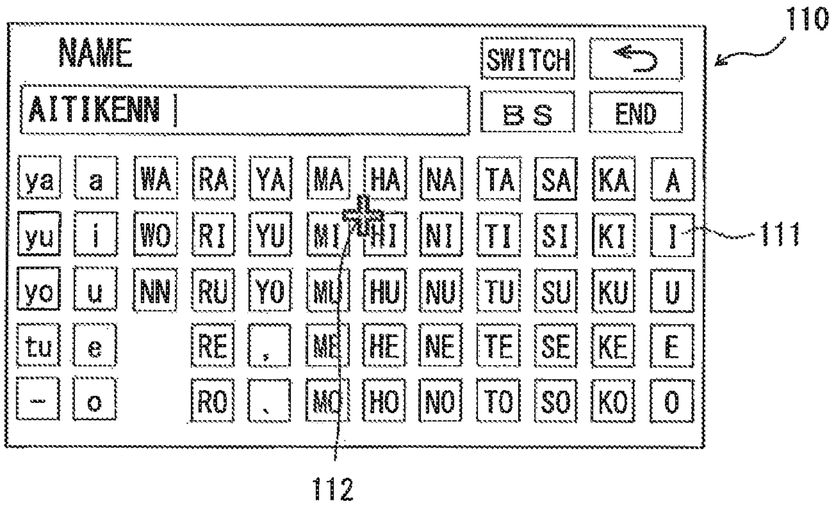
FIG. 7 is a plan view of a display screen of a display device, which receives information from the input device according to the first embodiment.

For example, the display device 100 has a display screen 110 shown in FIG. 7. The display screen 110 is arranged on a dashboard of a passenger compartment, at a substantially middle position with respect to a transverse direction of the vehicle.

The input device 10 has an operating member 12 to be operated by a user such as a driver. The operating member 12 is, for example, located on an upper surface of a center console beside a driver seat. Thus, a driver can operate the operating member 12 from the driver seat without largely changing his/her position.

The input device 10, as an input unit 11, includes the operating member 12 to be manually operated by a user, a restoring force generating part including a restoring force generating member 13 for automatically returning the operating member 12 to a stationary position, a detector 14 for detecting an operation state of the operating member 12, and an actuator 15 for applying an external force to the operating member 12.

Here, the stationary position means a position where the operating member 12 is held when it is not operated by a user. The stationary position is also referred to as an original position and a center position.

The input device 10 further includes a controller 16 for controlling a driving condition of the actuator 15 in accordance with a detection result of the detector 14 in the input unit 11. The input unit 11 further includes a housing 17. The housing 17 has a case 23 and the cover 20.

The operating member 12 is a member to be manually operated by a user. The operating member 12 is supported to be movable or displaceable along a XY plane including an X axis and a Y axis from the stationary position in arbitrary directions and rotatable about a Z axis. Here, movement of the operating member 12 in directions along the XY plane means displacement parallel to the XY plane and displacement in a rocking manner. The arbitrary directions include not only directions along the X axis and Y axis, but also any directions oblique to the X axis and Y axis. The X axis, the Y axis, and the Z axis are perpendicular to each other.

Figure 2:
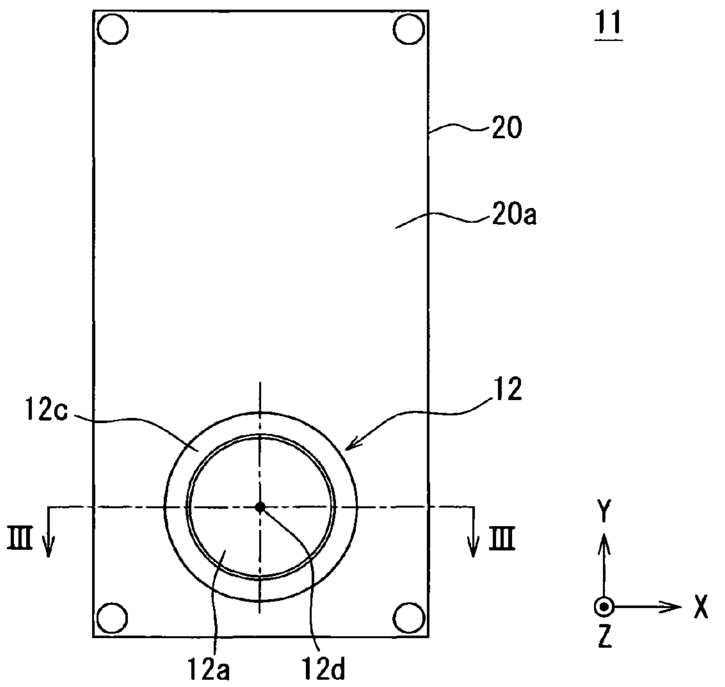
FIG. 2 is a schematic plan view of an input unit of the input device according to the first embodiment.

As shown in FIG. 2, the cover 20 of the housing 17 has a plate-like shape. The XY plane is defined along a surface of a wall 20*a* of the cover 20. That is, the XY plane is parallel to the surface of the wall 20*a*. The Z axis is defined in a direction where a thickness of the cover 20 is measured, that is, in a direction perpendicular to the surface of the wall 20*a*.

The operating member 12 is located on the wall 20*a*. The operating Member 12 is movable in any arbitrary directions along the XY plane. Also, the operating member 12 is movable in directions about the Z axis. That is, the operating member 12 is rotatable about the Z axis.

The operating member 12 has a generally disc shape with a substantially uniform thickness. The operating member 12 is disposed parallel to the wall 20*a* of the cover 20. Specifically, the operating member 12 has an upper surface 12*a* and a lower surface 12*b*. The lower surface 12*b* is opposed to the wall 20*a* of the cover 20, and the upper surface 12*a* is opposite to the lower surface 12*b*.

The upper surface 12*a* and the lower surface 12*b* are arranged in a relation of concentric circles, but an area of the upper surface 12*a* is smaller than an area of the lower surface 12*b*. The upper surface 12*a* connects to the lower surface 12*b* through a tapered side surface 12*c*.

The operating member 12 has a rotation axis 12*d* parallel to the Z axis and passing through the center of the upper surface 12*a* and the center of the lower surface 12*b*. The rotation axis 12*d* is defined at the origin of the XY plane, that is, an intersection of the X and Y axes.

The operating member 12 is coupled to a holding member 30. The holding member 30 constitutes a portion of a member for supporting the operating member 12 to the housing 17. Also, the holding member 30 serves to hold either magnets or electromagnets of the actuator 15.

For example, the holding member 30 has a base 30*a* and a projection 30*b* projecting from the base 30*a*. The holding member 30 has a generally rectangular outline in a direction along the XY plane.

The operating member 12 is formed with a recess 12*e* on the lower surface 12*b* at a position including the rotation axis 12*d*. The projection 30*b* passes through a through hole 20*b* of the cover 20 and is fitted in the recess 12*e* of the operating member 12.

Figure 3:
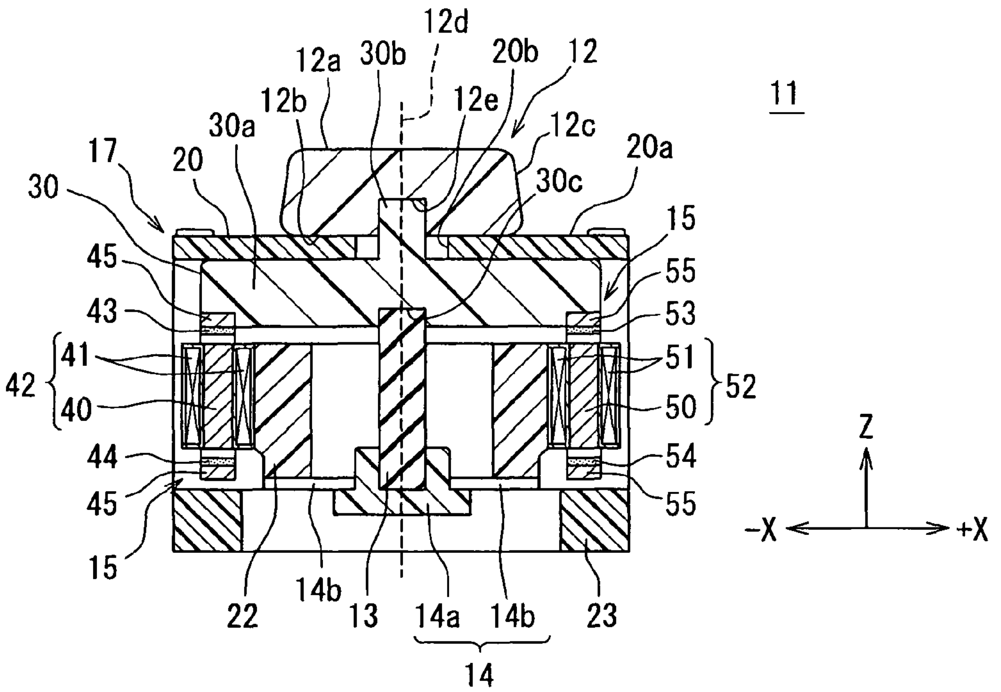
FIG. 3 is a cross-sectional view taken along a line III-III in FIG. 2.

In the example of FIG. 3, the operating member 12 and the holding member 30 are fixed to each other by fitting. However, the operating member 12 and the holding member 30 can be fixed to each other in any other ways. For example, the operating member 12 and the holding member 30 can be fixed to each other by bonding, screwing, or the like.

The projection 30*b* extends along the Z axis. The projection 30*b* has an outer diameter smaller than a diameter of the through hole 20*b*. That is, a predetermined space is provided around the projection 30*b* within the through hole 20*b*. Therefore, the holding member 30 is movable in any directions along the XY plane and rotatable about the Z axis with the operating member 12. Also, an axis of the projection 30*b* substantially coincides with the rotation axis 12*d* with respect to a direction along the XY plane.

The base 30*a* of the holding member 30 is in a form of cross along the X and Y axes, at a part facing the cover 20. In other words, the base 30*a* has a cruciform portion on the side adjacent to the cover 20. The base 30*a* has four thin portions divided by the cruciform portion. Thus, in the base 30*a*, the thickness of the thin portions is smaller than a portion corresponding to the cruciform portion.

Figure 4:
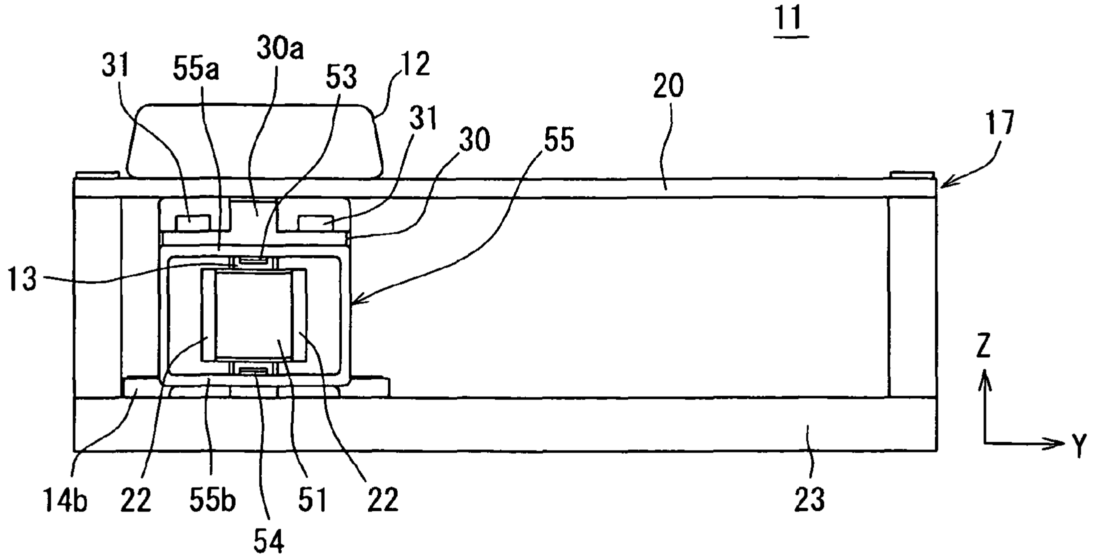
FIG. 4 is a schematic side view of the input unit viewed in a direction of an X axis in FIG. 2.

Yokes 45, 55 are fixed to the thin portions of the base 30*a* on a side opposite to the cover 20. In FIG. 4, the yoke 55 is exemplarily shown. The yokes 45, 55 are fixed to the holding member 30 by fixing members 31.

The restoring force generating part is configured to generate a force to automatically return the operating member 12 to the original position. For example, the restoring force generating part is constructed of the restoring force generating member 13 that generates a force, such as a reaction force, in a direction opposite to a direction in which the operating member 12 is operated.

The restoring force generating member 13 is directly connected to the operating member 12. Alternatively, the restoring force generating member 13 can be connected to the operating member through a link member or the like.

In the example, the restoring force generating part is provided as a member separate from the actuator 15. In such a case, the restoring force generating part is provided by an elastic member that generates a restoring force as the reaction force of elastic deformation. For example, the restoring force generating part is provided by an elastically deformable member 13 such as rubber or a member that is formed or machined to have elasticity.

In the example, the restoring force generating member 13 is a pillar-shaped or bar-shaped member made of rubber. A first end of the restoring force generating member 13 is fixed to a lower surface of the base 30*a*, the lower surface being opposite to the cover 20 and being parallel to the XY plane.

For example, the base 30*a* has a recess 30*c* on the lower surface and at a portion including the rotation axis 12*d*. The first end of the restoring force generating member 13 is fitted in the recess 30*c*. However, the fixing of the restoring force generating member 13 and the holding member 30 is not limited to the fitting. The restoring force generating member 13 can be fixed to the holding member 30 in other ways such as by bonding or screwing.

The restoring force generating member 13 extends along the Z axis when the operating member 12 is at the stationary position. The restoring force generating member 13 has an axis that generally coincides with the rotation axis 12*d*, with respect to a direction parallel to the XY plane.

The detector 14 serves to detect an operation state of the operating member 12. For example, the detector 14 detects a position of the operating member 12 with respect to the direction along the X axis, a position of the operating member 12 with respect to the direction along the Y axis, and a rotational position about the Z axis. Alternatively, the detector 14 detects a force applied to the operating member 12 in the direction along the X axis, a force applied to the operating member 12 in the direction along the Y axis and a moment about the Z axis.

The detector 14 can employ a known member. For example, in order to detect the positions, the detector 14 can employ a photosensor, a magnetic sensor or the like. In order to detect the forces, the detector 14 can employ a strain gauze or the like.

In the example embodiment, the detector 14 exemplarily employs strain gauzes 14*b*. The detector 14 includes the strain gauzes 14*b* and a holder 14*a*. The holder 14*a* is fixed to a second end of the restoring force generating member 13, which is opposite to the holding member 30, as shown in FIG. 3. The holder 14*a* is disposed such that a center thereof substantially coincides with the rotation axis 12*d*, with respect to the direction along the XY plane, when the operating member 12 is at the stationary position.

The strain gauzes 14*b* are arranged radially about the holder 14*a*, that is, about the rotation axis 12*d*, on a plane parallel to the XY plane. An inner end of each strain gauze 14*b* is fixed to the holder 14*a*.

As an example of such a radial arrangement, at least four strain gauzes 14*b* are arranged about the holder 14*a*, and in directions along the X axis and the Y axis. The directions along the X axis include a +X direction and a −X direction. The directions along the Y axis include a +Y direction and −Y direction. In other words, the four strain gauzes 14*b* are arranged on a +X axis, a −X axis, a +Y axis and a −Y axis.

It is noted that as the number of the strain gauzes 14*b* increases, detection accuracy improves. Thus, a displacement direction, that is, a direction of operation, and the amount of operation are properly detected. Specifically, the displacement direction can be more accurately detected.

An outer end of each strain gauze 14*b* is fixed to the case 23 as well as a support member 22 that supports a portion of the actuator 15. Alternatively, the strain gauzes 14*b* can be fixed only to the case 23.

In this way, the operating member 12 is supported by the case 23 of the housing 17 through the holding member 30; the restoring force generating member 13 and the detector 14. Thus, as the operating member 12 is operated, the holding member 30 is displaced in accordance with the displacement of the operating member 12. Further, the restoring forte generating member 13 is elastically deformed by being dragged in accordance with the displacement of the holding, member 30 as the first end of the restoring force generating member 13 is fixed to the holding member 30.

At this time, the strain gauze(s) 14*b* that is on a side to which the operating member 12 is displaced is compressed and the opposite strain gauze(s) 14*b* is stretched. Therefore, the operation state of the operating member 12, that is, displacement information including the displaced direction and the amount of displacement is detected based on variation in resistance of the strain gauzes 14*b*, as operation information.

The actuator 15 includes electromagnets and magnets. Each electromagnet includes a core made of a magnetic material and a coil integrated with the core. The controller 16 controls an electric current passing through the coil based on the detection result of the detector 14.

Each magnet has an opposed surface that is opposed to an end surface of the core through a predetermined clearance in the stationary condition where the operating member 12 is at the stationary position. The opposed surface has one of magnetic poles. One of the electromagnets and the magnets is integrated with the operating member 12.

In the stationary condition, two of the magnets are located on opposite sides of the rotation axis 12*d* on a plane parallel to the XY plane. Further, in the stationary condition, end surfaces of the cores are aligned with the magnets.

In the first embodiment, the actuator 15 has two cores 40, 50 that extend in the direction parallel to the Z axis. Each of the cores 40, 50 has end surfaces parallel to the XY plane. The cores 40, 50 are arranged on opposite sides of the rotation axis 12*d*, on a plane parallel to the XY plane.

For example, the cores 40, 50 are arranged on the X axis. The core 40 is located on a −X side, and the core 50 is located on a +X side, with respect to the rotation axis 12*d*. The cores 40, 50 are equidistant from the rotation, axis 12*d*.

A coil 41 is wound around the core 40. Similarly, a coil 51 is wound around the core 50. The core 40 and the coil 41 constitute an electromagnet 42. The core 50 and the coil 51 constitute an electromagnet 52.

The electromagnets 42, 52 are arranged on opposite sides of the rotation axis 12*d* on a plane parallel to the XY plane. The electromagnets 42, 52 are supported by the support member 22, which is made of a non-magnetic material. The support member 22 is fixed to the case 23 of the housing 17, at a non-illustrated location. That is, the electromagnets 42, 52 are not displaced with the displacement of the operating member 12. In other words, the electromagnets 42, 52 are always held at predetermined positions. In the case where the electromagnets 42, 52, which require electric wirings for the coils 41, 51, are fixed in the housing 17, reliability in view of electric connections improves.

Next, a structure of the cores 40, 50 will be described with reference to FIGS. 4, 5A and 5B. Because the cores 40, 50 have a similar structure, the description and illustration will be given mainly with respect to the core 50 as an example.

In the stationary condition where the operating member 12 is at the stationary position, two magnets 53, 54 are located on opposite sides of the core 50 with respect to the direction parallel to the Z axis. Specifically, in the stationary condition, the magnet 53 is opposed to an end surface 50*a* of the core 50. The magnet 54 is opposed to an opposite end surface 50*b* of the core 50.

The magnet 53 has an opposed surface 53*a* opposed to the core end surface 50*a*. The opposed surface 53*a* is parallel to the XY plane. In the stationary condition, the opposed surface 53*a* is spaced from the core end surface 50*a* by a predetermined distance.

The magnet 54 has an opposed surface 54*a* opposed to the core end surface 50*b*. The opposed surface 54*a* is parallel to the XY plane. In the stationary condition, the opposed surface 54*a* is spaced from the core end surface 50*b* by the predetermined distance.

In the stationary condition, an axis of the core 50 is parallel to the Z axis. Further, the axes of the magnets 53, 54 coincide with the axis of the core 50 when viewed in a direction perpendicular to the XY plane. Namely, in the stationary condition where the operating member 12 is at the stationary position, the axis of the core 50 and the axes of the magnets 53, 54 are aligned, that is, located at the same position on the XY plane.

In the first embodiment, the magnets 53, 54 are permanent magnets. Thus, structures of the magnets 53, 54 and control of the actuator 15 are simplified. Alternatively, the magnets 53, 54 can be provided by electromagnets each constructed of a core and a coil. The magnets 53, 54 are magnetized in the same direction. The opposed surface 53*a* has the south pole. The opposed surface 54*a* has the north pole.

The magnets 53, 54 are the permanent magnets having the same structure. The position of the magnet 53 coincides with the position of the magnet 54 when viewed along a direction perpendicular to the XY plane. That is, the magnets 53, 54 are located at the same position on the XY plane.

The yoke 55 is made of a magnetic material. The yoke 55 has an annular or loop shape. The magnet 53 is fixed to an inner surface of the yoke 55 such that a surface opposite to the opposed surface 53*a* and having the north pole contacts the inner surface. The second magnet 54 is fixed to the inner surface of the yoke 55 such that a surface opposite to the opposed surface 54*a* and having the south pole contacts the inner surface. Thus, magnetic field lines substantially straightly extend from the opposed surface 54*a* of the magnet 54 to the opposed surface 53*a* of the magnet 53, as shown by solid line arrows in FIGS. 5A and 5B.

In the first embodiment, as shown in FIG. 4, the yoke 55 has a rectangular loop shape. A side 55*a* of the yoke 55 to which the magnet 53 is fixed is fixed to a peripheral portion of the lower surface of the base 30*a*, the lower surface being parallel to the XY plane. The magnet 54 is fixed to a side 55*b* of the yoke 55, the side 55*b* being opposite to the side 55*a*.

In this way, the magnets 53, 54 are fixed to the yoke 55, and the yoke 55 is fixed to the holding member 30. Therefore, the magnets 53, 54 and the yoke 55 are displaced with the operating member 12. That is, the magnets 53, 54 and the yoke 55 are movable relative to the electromagnet 52.

The core 50 is located between the opposed surfaces 53*a*, 54*a* having the opposite polarities. Therefore, in a condition where, the coil 51 is not supplied with electric current, the core 50 is magnetized by a magnetic field created between the magnets 53, 54, and thus serves as a magnet.

In this case, the core end surface 50*a*, which is opposed to the magnet 53, has the north pole, and the core end surface 50*b*, which is opposed to the magnet 54, has the south pole.

When the electric current is supplied to the coil 51, the core 50 is magnetized by the magnetic field created by the magnets 53, 54 and a magnetic field created by the electric current passing through the coil 51.

In the first embodiment, in order to provide favorable tactile feeling, it is configured such that attracting magnetic forces are created between the core end surface 50*a* and the opposed surface 53*a* and between the core end surface 50*b* and the opposed surface 54*a*, when the electromagnet 52 is in operation by energizing the coil 51.

Figure 5A:
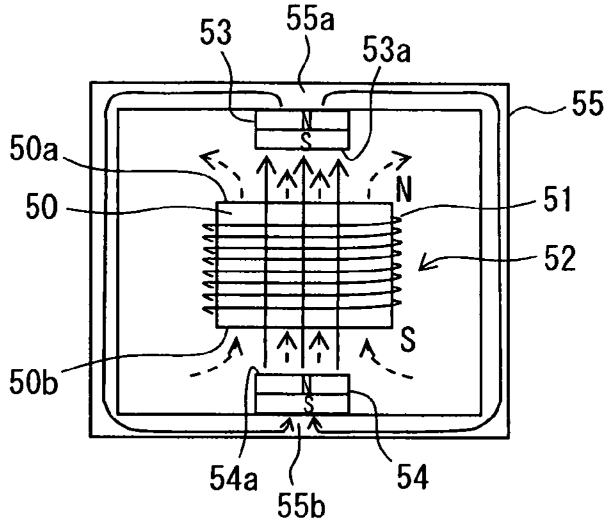
FIG. 5A is a schematic view of an actuator of the input unit in a case of increasing a magnetic force, according to the first embodiment.

For example, in a case where the electric current is supplied in a direction so that the core end surface 50*a* has the north pole and the core end surface 50*b* has the south pole only by energization of the coil 51, the magnetic field is created as shown by dashed line arrows in FIG. 5A. Thus, the direction of the magnetic field lines created by the magnetic forces between the magnets 53, 54 is the same as the direction of the magnetic field lines passing through the core 50 by the energization of the coil 51.

Therefore, magnetic forces exerted between the core end surfaces 50*a*, 50*b* and the opposed surfaces 53*a*, 54*a* during an energized state of the coil 51 are larger than that during a non-energized state of the coil 51, because the magnetic field produced by the energization of the coil 51 is superimposed. In such a case, although the intensity of the magnetic force, such as Coulomb force, varies in accordance with the magnitude of the electric current, the magnetic forces exerted between the core end surfaces 50*a*, 50*b* and the opposed surfaces 53*a*, 54*a* are the attracting magnetic forces.

Figure 5B:
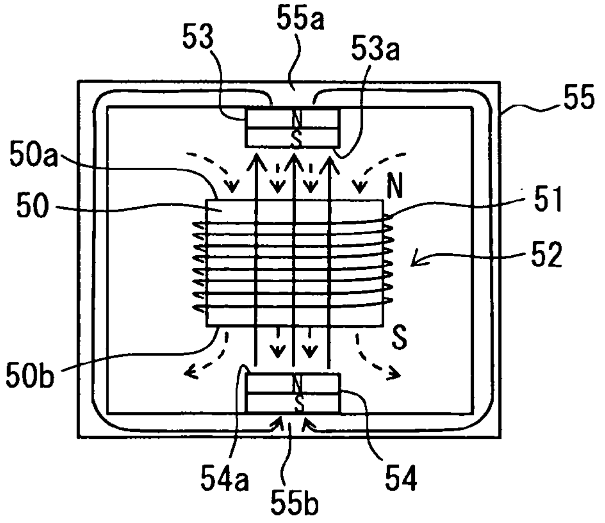
FIG. 5B is a schematic view of the actuator of input unit in a case of reducing the magnetic force, according to the first embodiment.

On the other hand, in a case where the electric current is supplied in a direction so that the core end surface 50*a* has the south pole and the core end surface 50*b* has the north pole only by energization of the coil 51, the magnetic field is created as shown by dashed line arrows in FIG. 5B. That is, the direction of the magnetic field lines passing through the core 50 by the energization of the coil 51 is opposite to the direction of the magnetic field lines created between the magnets 53, 54.

In the first embodiment, the magnitude of the electric current is determined in a range where the magnetic forces exerted between the core end surfaces 50*a*, 50*b* and the opposed surfaces 53*a*, 54*a* are the attracting magnetic forces. The magnetic forces exerted between the core end surfaces 50*a*, 50*b* and the opposed surfaces 53*a*, 54*a* are reduced by being offset by the magnetic field produced by the energization of the coil 51. That is, although the magnet forces between the core end surfaces 50*a*, 50*b* and the opposed surfaces 53*a*, 54*a* during the energized state of the coil 51 is smaller than that during the non-energized state, the magnetic forces are still the attracting forces.

The electromagnet 42 has the similar structure as the electromagnet 52.

Regarding the electromagnet 42, in the stationary condition where the operating member 12 is at the stationary position, a magnet 43 is arranged to oppose a core end surface of the core 40, and a magnet 44 is arranged to oppose an opposite core end surface of the core 40.

The magnets 43, 44 have opposed surfaces opposed to the core end surfaces of the core 40, respectively. The opposed surfaces, of the magnets 43, 44 are parallel to the XY plane. In the stationary condition where the operating member 12 is at the stationary position, the opposed surfaces are spaced from the core end surfaces of the core 40 by the predetermined distance.

The core 40 has an axis parallel to the Z axis. In the stationary condition, the axis of the core 40 coincides with axes of the magnets 43, 44 when viewed in a direction perpendicular to the XY plane. That is, in the stationary condition, the axis of the core 40 and the axes of the magnets 43, 44 are located at the same position on the XY plane.

The magnets 43, 44 are permanent magnets having the same structure as the magnets 53, 54. The magnets 43, 44 are magnetized in the same direction as the magnets 53, 54. The opposed surface of the magnet 43 has the south pole, and the opposed surface of the magnet 44 has the north pole.

The magnets 43, 44 are located at the same position on the XY plane, that is, located at the same position when viewed along the direction perpendicular to the XY plane. The yoke 45 is made of a magnetic material. The yoke 45 has an annular or loop shape.

The magnet 43 is fixed to an inner surface of the yoke 45 such that a surface opposite to the opposed surface and having the north pole contacts the inner surface. The magnet 44 is fixed to the inner surface of the yoke 45 such that a surface opposite to the opposed surface and having the south pole contacts the inner surface. Further, the magnetic field lines substantially straightly extend from the opposed surface of the magnet 44 to the opposed surface of the magnet 43.

The yoke 45 is fixed to the peripheral portion of the lower surface of the base 30*a*, at a position opposite to the yoke 55 with respect to the rotation axis 12*d*. That is, the magnets 43, 44 are fixed to the yoke 45, and the yoke 45 is fixed to the holding member 30. Therefore, the magnets 43, 44 and the yoke 45 are displaced with the operating member 12.

Accordingly, in the stationary condition, the magnets 43, 44 are opposed to the core 40 and the magnets 53, 54 are opposed to the core 50, with respect to the direction parallel to the Z axis. Further, the distances between the core end surfaces of the cores 40, 50 and the opposed surfaces of the magnets 43, 44, 45, 46 are the same predetermined distances.

The magnets 43, 53 are located on opposite sides of the rotation axis 12*d*, on a plane parallel to the XY plane. Similar to the cores 40, 50, the magnets 43, 53 are located on the X axis. The magnet 43 is located on the −X side, and the magnet 53 is located on the +X side. The magnets 43, 53 are equidistant from the rotation axis 12*d*. The magnets 43, 53 constitute a first pair of magnets.

The magnets 44, 54 are located on opposite sides of the rotation axis 12*d*, on a plane parallel to the XY plane. Similar to the cores 40, 50, the magnets 44, 54 are arranged on the X axis. The magnet 44 is located on the −X side, and the magnet 54 is located on the +X side. The magnets 43, 53 are equidistant from the rotation axis 12*d*. The magnets 44, 54 constitute a second pair of magnets.

The controller 16 serves to control an operation condition of the actuator 15 in accordance with the detection result of the detector 14, in order to apply an external force to the operating member 12 when the operating member 12 is operated by the user, thereby to provide a user's hand with a tactile feeling.

For example, the controller 16 is connected to a serial communication bus (not shown), which constitutes an on-vehicle network. The controller 16 is connected to the display device 100, which is an object to be operated by the input device 10, as well as other ECUs so as to make communication with the ECUs.

As shown in FIG. 1, the controller 16 includes a CPU 16*a*, a storage 16*b*, an input part 16*c*, a first drive circuit 16*d* and a second drive circuit 16*e*. The storage 16*b* includes a ROM, a RAM, and a hard drive and an external memory such as a non-volatile memory, which are provided separately from the ROM, RAM, and the like.

The input part 16*c* receives a detection signal outputted from the detector 14 such as the strain gauzes 14*b* and sends the signal to the CPU 16*a*. The first and second drive circuits 16*d*, 16*e* output driving power in accordance with driving signals outputted from the CPU 16*a* to the coils 41, 51, thereby to drive the actuator 15.

Various programs and data necessary for executing the programs are stored in the ROM and the external memory. The CPU 16*a* uses the RAM as a work area as executing the programs.

When the operation direction such as the displacement direction and the amount of operation such as the amount of displacement of the operating member 12 are obtained based on the detection signal from the detector 14 as feedback, the controller 16 outputs a driving signal to the display device 100 for moving a cursor 112 displayed on the display screen 110 in a direction corresponding to an operation direction of the operating member 12 and by a distance corresponding to the amount of operation of the operating member 12.

Further, when the operation direction and the amount of operation of the operating member 12 are detected, the controller 16 outputs a signal for driving the actuator 15 to apply a force in a direction opposite to the operation direction at a predetermined timing based on location information of the cursor 112 and location information of icons 111 displayed on the display screen 110.

Next, the operation direction of the operating member 12 and the external force applied to the operating member 12 will be described.

Figure 6A:
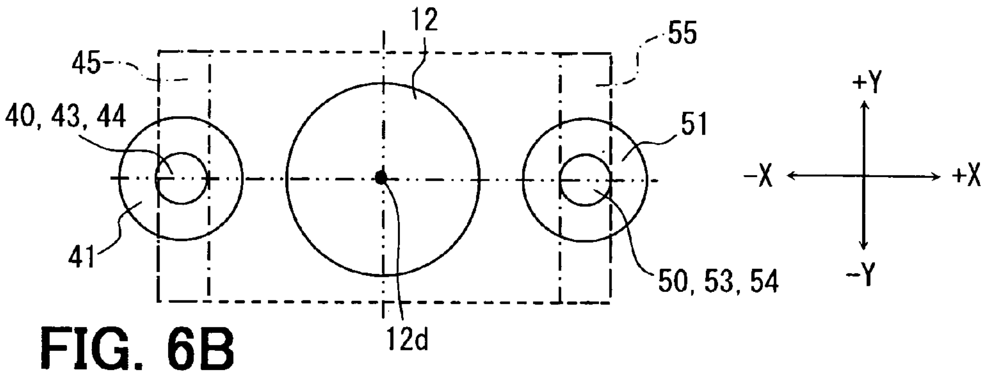
FIG. 6A is an explanatory view of the input unit when an operating member is at a stationary position.

FIG. 6A shows the stationary condition where the operating member 12 is at the stationary position without being operated by the user. In the stationary condition, the cores 40, 50 and the magnets 43, 44, 53, 54 are located on the X axis. The core 40 and the magnets 43, 44 are coaxially aligned, when viewed in a direction parallel to the Z axis. Also, the core 50 and the magnets 53, 54 are coaxially aligned in a direction parallel to the Z axis.

Figure 6B:
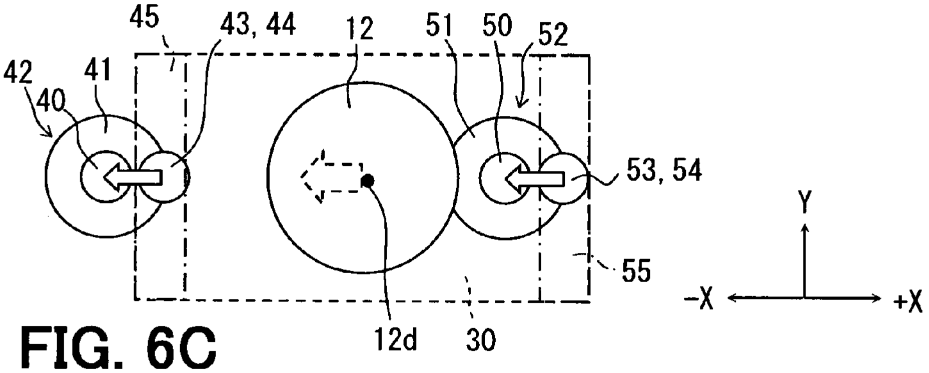
FIG. 6B is an explanatory view of the input unit for explaining an external force applied to the operating member by energization of a coil of an electromagnet, when the operating member is moved in a +X direction, according to the first embodiment.

In a case where the operating member 12 is operated in the +X direction by the user from the stationary position shown in FIG. 6A, the magnets 43, 44, 53, 54 and the yokes 45, 55 are displaced with the displacement of the operating member 12. As shown in FIG. 6B, therefore, the magnets 43, 44 are shifted in the +X direction with respect to the core 40, and the magnets 53, 54 are shifted in the +X direction from the core 50. The amount of shift of the magnets 43, 44 is the same as the amount of shift of the magnets 53, 54.

When the operating member 12 is operated in the +X direction, a force in the −X direction is exerted to the operating member 12 in accordance with the amount of operation by a reaction force of elastic deformation of the restoring force generating member 13 and an effect of the permanent magnets 43, 44, 53, 54, such as the attracting magnetic forces.

If the electric current is supplied to the coils 41, 51 in the direction to increase the attracting magnetic forces as shown in FIG. 5A at a timing while the operating member 12 is operated in the +X direction, the attracting magnetic forces shown by solid line arrows in FIG. 6B increase, as compared with the attracting magnetic forces exerted during the non-energized state of the coils 41, 51. As such, the change in the magnetic forces is transformed as a change in an external force in the reverse direction (−X direction), as shown by a dashed line arrow in FIG. 6B.

Accordingly, a tactile feeling different from a feeling provided in the non-energized state is provided by the external force, which is along the operation direction. That is, a force in the −X direction, which is greater than a force in the −X direction exerted in the non-energized state, is exerted, and thus a favorable tactile feeling such as a brake feeling can be provided.

In a case where the electric currents are supplied to the coils 41, 51 in the direction to reduce the attracting magnetic forces as shown in FIG. 5B, a force in the −X direction, which is smaller than the force in the −X direction in the non-energized state, is exerted. Therefore, a tactile feeling different from a feeling provided in the non-energized state is provided by the external force, which is along the operation direction.

Figure 6C:
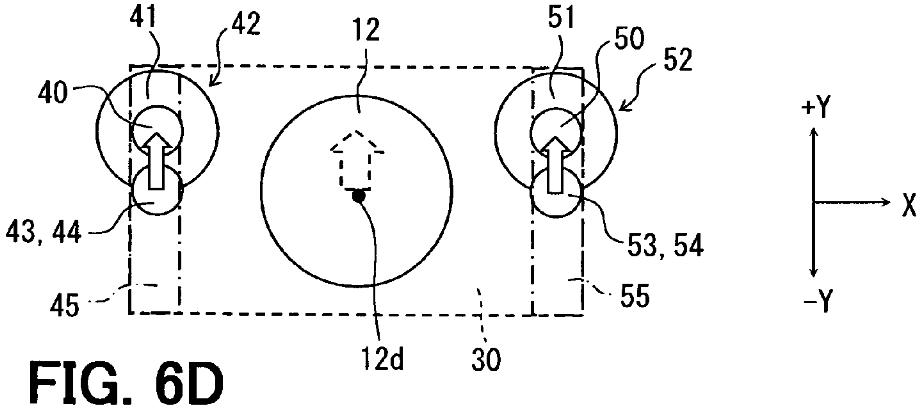
FIG. 6C is an explanatory view of the input unit for explaining an external force applied to the operating member by energization of the coil, when the operating member is moved in a −Y direction, according to the first embodiment.

In a case where the operating member 12 is operated in the −Y direction by the user from the stationary position shown in FIG. 6A, the magnets 43, 44, 53, 54 and the yokes 45, 55 are displaced with the displacement of the operating member 12. As shown in FIG. 6C, therefore, the magnets 43, 44 are shifted in the −Y direction with respect to the core 40 and the magnets 53, 54 are shifted in the −Y direction with respect to the core 50. At this time, the amount of shift of the magnets 43, 44 is the same as the amount of shift of the magnets 53, 54.

When the operating member 12 is operated in the −Y direction, a force in the +Y direction is exerted to the operating member 12 in accordance with the amount of operation by a reaction force of elastic deformation of the restoring force generating member 13 and an effect of the permanent magnets 43, 44, 53, 54, such as the attracting magnetic forces.

If the electric currents are supplied to the coils 41, 51 in the direction to increase the attracting magnetic forces as shown in FIG. 5A at a timing while the operating member 12 is operated in the −Y direction, the attracting magnetic forces shown by solid line arrows in FIG. 6C increase, as compared with the attracting magnetic forces exerted during the non-energized state of the coils 41, 51. As such, the change in the magnetic forces is transformed as a change in an external force in the reverse direction (+Y direction), as shown by dashed line arrow in FIG. 6C.

Accordingly, a tactile feeling different from a feeling provided in the non-energized state is provided by the external force, which is along the operation direction. That is, a force in the +Y direction, which is greater than a force in the +Y direction during the non-energized state, is exerted, and thus a favorable tactile feeling such as a brake feeling can be provided.

In a case where the electric currents are supplied to the coils 41, 51 in the direction to reduce the attracting magnetic forces as shown in FIG. 5B, a force in the +Y direction, which is smaller than the force in the +Y direction in the non-energized state, is exerted. Therefore, a tactile feeling different from that in the non-energized state is provided by the external force, which is along the operation direction.

Figure 6D:
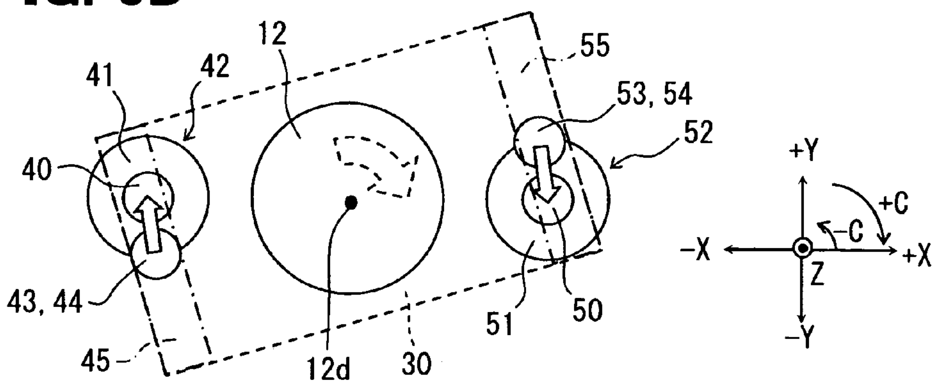
FIG. 6D is an explanatory view of the input unit for explaining an external force exerted to the operating member by energization of the coil, when the operating member is rotated in a −C direction, according to the first embodiment.

In a case where the operating member 12 is rotated from the stationary position shown in FIG. 6A in a counterclockwise direction, that is, in a −C direction, about the rotation axis 12*d* and along the XY plane by the user, the magnets 43, 44, 53, 54 and the yokes 45, 55 are displaced with the displacement of the operating member 12. Thus, as shown in FIG. 6D, the magnets 43, 44 are displaced in the −C direction with respect to the core 40, and the magnets 53, 54 are displaced in −C direction with respect to the yoke 50. The amount of shift of the magnets 43, 44 is the same as the amount of shift of the magnets 53, 54.

In the embodiment, the magnets 43, 53 are arranged on opposite sides of the rotation axis 12*d*. Also, the magnets 44, 54 are arranged on opposite sides of the rotation axis 12*d*. Thus, in the stationary condition, the attracting magnetic forces between the core 40 and the magnets 43, 44 and the attracting magnet forces between the core 50 and the magnets 54 are exerted.

As such, when the operating member 12 is operated in the −C direction, a force in a clockwise direction, that is, in +C direction, is exerted to the operating member 12 in accordance with the amount of operation by the reaction force of the elastic deformation of the restoring force generating member 13 and the mutually attracting magnetic forces at the above-described two positions.

If the electric currents are supplied to the coils 41, 51 in the direction to increase the attracting magnet forces as shown in FIG. 5A at a timing where the operating member 12 is operated, for example, in the −C direction, the attracting magnet forces shown by solid line arrows in FIG. 6D increase as compared with that during the non-energized state. The change in the magnet forces is transformed to the operating member 12 as a change in an external force in the reverse direction (+C direction), as shown by a dashed line arrow in FIG. 6D.

As such, a tactile feeling different from that of the non-energized state is provided by the external force, which is along the operating direction. That is, the force in the +C direction, which is greater than that of the non-energized state, is exerted, and thus a favorable tactile feeling such as a brake feeling is provided.

In a case where the electric currents are supplied in the direction to reduce the attracting magnetic forces as shown in FIG. 5B, a force in the +C direction, which is smaller than the force in the +C direction in the non-energized sate, is exerted. Therefore, a tactile feeling different from that in the non-energized state is provided by the external force, which is along the operation direction.

In the stationary condition, the cores 40, 50 are located on the opposite sides of the rotation axis 12*d*. Further, the magnets 43, 44 are located on opposite sides of the rotation axis 12*d*, and the magnets 53, 54 are located on opposite sides of the rotation axis 12*d*. In addition, the magnets 43, 44, 53, 54 are magnetized in the same direction. The electric currents are supplied to the coils 41, 51 in the range where the attracting magnet forces are produced.

Therefore, when the angle of rotation of the operating member 12 exceeds 90 degrees, that is, ¼ turns, for example, the magnets 53, 54 become closer to the core 40 than the core 50. As a result, attracting magnet forces are produced between the magnets 53, 54 and the core 40. Similarly, attracting magnet forces are produced between the magnets 43, 44 and the core 50.

That is, when the amount of rotational operation of the operating member 12 is within the ¼ turn, an external force in the reverse direction such as in the +C direction is exerted. When the amount of rotational operation of the operating member 12 is between the ¼ turn and ½ turn, the external force in the operation direction such as in the −C direction is exerted.

When the amount of rotational operation is between the ½ turn and ¾ turn, the external force in the reverse direction such as in the +C, direction is exerted. When the amount of rotational operation is between ¾ turn and one turn, the external force in the operation direction such as in the −C direction is exerted. Therefore, in order to provide only the brake feeling, for example, the input unit 11 can be provided with a restriction member for restricting the rotation of the operating member 12 within the ¼ turn.

The relationship between the operation direction of the operating member 12 and the external force applied to the operating member 12 is described hereinabove with respect to the cases where the operating member 12 are operated in the +X direction, the −Y direction and the −C direction. Also in the cases where the operating member 12 is operated to the −X direction, the +Y direction and the +C direction, the external force is exerted to the operating member 12 in the similar manner. Further, also in the cases where the operating member 12 is operated in a direction oblique to the X axis and the Y axis as the arbitrary directions along the XY plane, the external force is exerted in the similar manner.

Next, an example of providing a tactile feeling in the display device 100 will be described. Specifically, the description will be made in a case of inputting a destination in a navigation system for a vehicle as an example.

Referring to FIG. 7, the display screen 110 of the display device 100 includes the icons 111 representing characters, functions, and the like. In the example of FIG. 7, the characters and functions are exemplarily illustrated in Japanese alphabets. The icons 111 represent Japanese alphabets.

The cursor 112 on the display screen 110 is in connection with the operating member 12 of the input unit 10. The cursor 112 can be freely moved in any directions such as right, left, up and down directions and rotational direction by operating the operating member 12 with similar feeling as operating a mouse of a computer.

The input unit 11 is provided with an OK button (not shown). When the OK button is pressed after the cursor 112 is moved to a desired position by operating the operating member 12 so as to select a character or a function, the corresponding character is inputted or the corresponding function is decided.

For example, as the operating member 12 is operated in the +X direction, the cursor 112 is moved in the +X direction on the display screen 110. Thus, an icon 111 indicated by the cursor 112 is successively changed.

Figure 8:
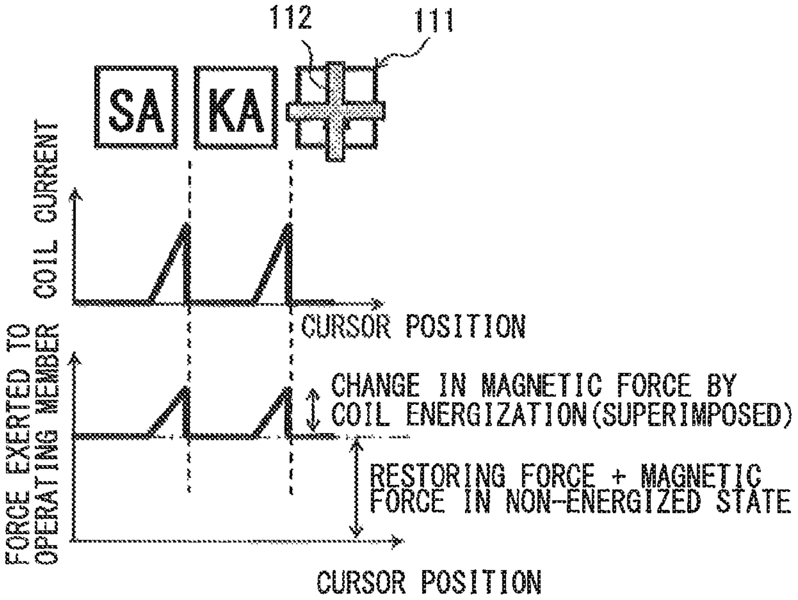
FIG. 8 is a schematic diagram showing a relationship between a position of a cursor and a force exerted to the operating member according to the first embodiment.

In this case, the controller 16 controls the actuator, 15 such as the direction and/or magnitude of the electric currents passing through the coils 41, 51 so that a force applied to the operating member 12 to return to the stationary position gradually increases as the cursor 112 becomes close to a boundary (frame) of each icon 111, for example, as shown in FIG. 8. In the example of FIG. 8, when the cursor 112 is moved in the +X direction in the display screen 110, energization of the coils 41, 51 begins before the cursor 112 thoroughly passes through the icon 111.

When the cursor 112 reaches the boundary of the next icon 111, such as, a left end of the icon 111, the controller 16 stops the energization of the coils 41, 51. As such, the magnetic force superimposed by the energization of the coils 41, 51 disappears.

Therefore, the operating member 12 is in condition of receiving the restoring force generated by the reaction force of the elastic deformation of the restoring force generating member 13 and the attracting magnetic forces produced in the non-energized state between the permanent magnets 43, 44, 53, 54 and the end surfaces of the cores 40, 50.

By the above control, the external force along the operating direction is exerted to the operating member 12. In the first embodiment, for example, the external force is exerted in the reverse direction, that is, in the direction opposite to the operating direction. In such a case, the user can favorably realize the operating direction of the cursor 112 without carefully fixing his eyes on the display screen 110.

In addition, by changing the magnitude of the electric currents, an illusion of operating on a rough surface along the icons 111 can be created. Such a tactile feeling can be created by controlling a current waveform.

It is noted that the restoring force by the reaction force of the elastic deformation of the restoring force generating member 13 increases as a function of an operated distance of the operating member 12 from the stationary position. Also, in the non-energized state of the coils 41, 51, the magnetic forces (Coulomb force) between the magnets 43, 44, 53, 54 and the end surfaces of the cores 40, 50 reduce as a function of an operated distance of the operating member 12 from the stationary position.

In the example of FIG. 8, because each icon 111 exists in a small area, 20, the force exerted to the operating member 12 in the non-energized state is shown as a constant value irrespective of the position of the cursor 112 for the sake of convenience.

In the above description, the tactile feeling is provided in a case where the operating member 12 is operated in the +X direction. However, also in the cases where the operating member 12 is operated in any other directions along the XY plane, such as in the −X direction, in the +Y direction, in an oblique direction, the tactile feeling can be provided in the similar manner.

Also in a case of operating a position of a member in a rotational manner such as to operate the sound volume of an audio system and the temperature of an air conditioning system, the external force along the direction of rotation such as in the reverse direction is applied to the operating member 12. Therefore, the user can favorably recognize the operating direction of the cursor 112 without carefully fixing his/her eyes on the display screen 110.

If the energization and the non-energization of the coils 41, 51 are repeated in a short time, the operating member 12 can be vibrated. In such a case, a vibrated tactile feeling can be provided to the user as a warning signal, for example.

Figure 9:
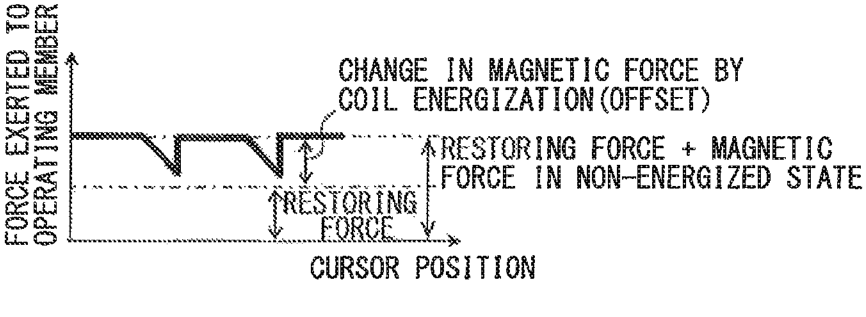
FIG. 9 is a schematic diagram showing a relationship between a position of a cursor and a force exerted to the operating member according to another example of the first embodiment.

FIG. 9 shows control of the actuator 15 by the controller 16. The controller 16 controls the actuator 15 such as the direction of electric currents passing through the coils 41, 51 and/or the magnitude of the electric currents so that a force exerted to the operating member 12 for returning to the stationary position gradually reduces as the cursor 112 becomes close to the boundary (frame) of the icon 111.

In this case, the force exerted to the operating member 12 in the direction opposite to the operation direction is changed by offsetting a part of the attracting magnetic forces produced in the non-energized state between the permanent magnets 43, 44, 53, 54 and the end surfaces of the cores 40, 50 by the energization of the coils 41, 51. Thus, the user favorably recognizes the operating direction of the cursor 112.

As described above, when the coils 41, 51 are energized, the magnetic flux changes from that in the non-energized state, and thus the tactile feeling can be provided to the user's hand through the operating member 12.

In the stationary condition, the magnets 43, 53 are located on the opposite sides of the rotation axis 12*d* on the plane parallel to the XY plane. Also, the magnets 44, 54 are located on the opposite sides of the rotation axis 12*d* on the plane parallel to the XY plane. Further, each of the magnets 43, 44, 53, 54 is arranged to oppose the end surface of the corresponding cores 40, 50.

Therefore, when the operating member 12 is rotated about the rotation axis 12*d*, the external force along the direction of rotation such as in the direction opposite to the operation direction can be applied by the magnetic forces exerted between the end surfaces of the cores 40, 50 and the magnets 43, 44, 53, 54. In the first embodiment, such an external force is applied by the change in the magnetic forces.

Also in the case where the operating member 12 is displaced in any directions along the XY plane, the external force along the operation direction can be applied to the operating member 12 by the above-described magnetic force.

Accordingly, confirmation of the operation, in, particular, when operated in the rotational manner, improves. In the case where the input device 10 is employed as an input device for inputting information to the display device 100 including the display screen 110, the user easily confirm the moved direction of the cursor 112, that is, the operation direction of the operating member 12, without carefully watching the display screen 110. This is advantageous if the user is a driver.

Further, even if the electric currents passing through the coils 41, 51 are small, a large tactile feeling is provided. Therefore, power consumption reduces.

As described above, the operating member 12 is supported to be displaceable in directions parallel to the XY plane, and the end surfaces of the cores 40, 50 and the opposed surfaces of the magnets 43, 44, 53, 54 are parallel to the XY plane. Therefore, when the operating member 12 is displaced in an arbitrary direction along the XY plane, such as in the direction along the X axis, the direction along the Y axis and the oblique direction, the amounts of displacement between the magnet 43 and the core 40, between the magnet 44 and the core 40, between the magnet 53 and the core 50, and between the magnet 54 and the core 50 are equal. When the operating member 12 is displaced in the direction of rotation about the Z axis, the amounts of displacement along the direction of rotation between the magnet 43 and the core 40, between the magnet 44 and the core 40, between the magnet 53 and the core 50, and between the magnet 54 and the core 50 are equal. Further, the cores 40, 50 and the magnets 43, 44, 53, 54 are arranged such that the magnetic force between the core 40 and the magnet 43, the magnetic force between the core 40 and the magnet 44, the magnetic force between the magnet 53 and the core 50 and the magnetic force between the magnet 54 and the core 50 are the same, such as the same attracting forces. Therefore, it is not necessary to independently control the electric currents to the electromagnets 42, 52, which are located on the opposite sides of the rotation axis 12*d*. As such, a structure is simplified.

The core 40 extends in the direction of Z axis, and the magnets 43, 44 are arranged at the opposite end surfaces of the core 40, which are parallel to the XY plane. The attracting magnetic force is produced at each end of the core 40. Similarly, the core 50 extends in the direction of Z axis, and the magnets 53, 54 are arranged at the opposite end surfaces of the core 50, which are parallel to the XY plane. The attracting magnetic force is produced at each end of the core 50. Further, the cores 40, 50 are arranged on the opposite sides of the rotation axis 12*d*.

Accordingly, even if the operating member 12 is operated in any directions along the XY plane or rotated in a direction about the Z axis, the distances between the end surfaces of the cores 40, 50 and the corresponding magnets 43, 44, 53, 54 with respect to the direction of Z axis are maintained as the predetermined distances, which are defined in the stationary condition. That is, unevenness of opposed distances between the end surfaces of the cores 40, 50 and the corresponding magnets 43, 44, 53, 54 is reduced. Therefore, unevenness of tactile feelings with respect to the direction of the Z axis is reduced.

Second Embodiment

Figure 10:
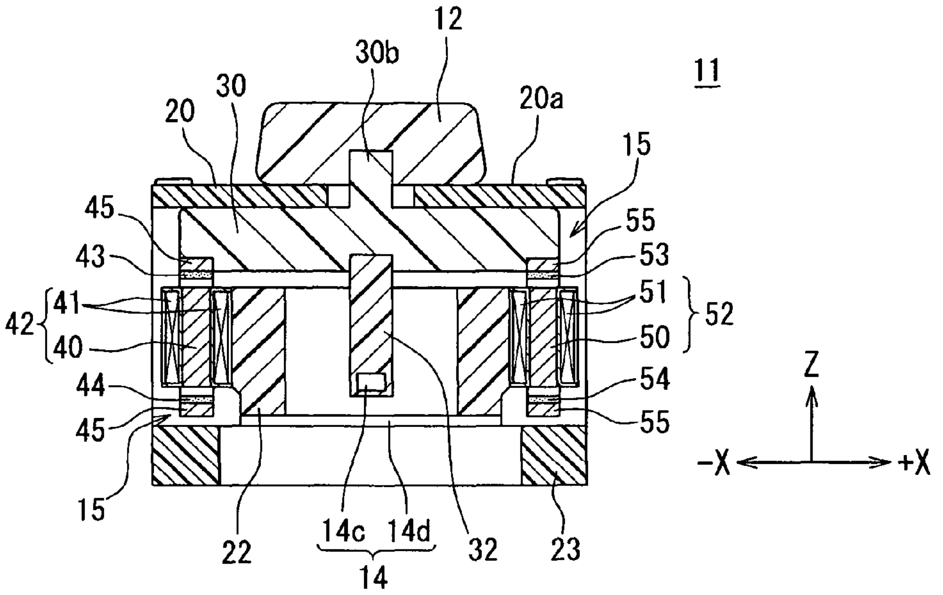
FIG. 10 is a schematic cross-sectional view of an input unit of an input device according to a second embodiment of the present invention.

An input device according to the second embodiment of the present invention will be described with reference to FIGS. 10 to 11B. As shown in FIG. 10, the restoring force generating part is included in the actuator 15. That is, the input device 10 does not have the restoring force generating member 13 as an individual member. In other words, the restoring force generating part is not provided as a member separate from the actuator 15. Instead, it is configured that the actuator 15 has a function of the restoring force generating member 13.

Other structures are generally the same as the input device 10 of the first embodiment. The magnets 43, 44, 53, 54 are the permanent magnets. Here, since the restoring force generating member 13 is not provided, the detector 14 is constructed as a non-contact location information detecting part. For example, the detector 14 is constructed of a permanent magnet 14*c* and multiple hall devices 14*d*.

The permanent magnet 14*c* is made of a non-magnetic material. A member 32 having a pillar shape or a bar shape is fixed to the lower surface of the holding member 30. The member 32 extends in the direction of the Z axis. The permanent magnet 14*c* is held on a lower end of the member 32, the lower end being opposite to an upper end fixed to the holding member 30. The permanent magnet 14*c* is capable of displacing with the displacement of the operating member 12.

The hall devices 14*d* are provided at least four locations, relative to the permanent magnet 14*c* as a center. The hall devices 14*d* are arranged in the direction of the X axis (+X direction and −X direction) and the direction of the Y axis (+Y direction and −Y direction). With respect to the direction of the Z axis, a predetermined clearance is formed between the lower end of the member 32 and each hall device 14*d* to avoid the member 32 from contacting the hall devices 14*d* when the operating member 12 is operated.

The detector 14 is not limited to the above-described non-contact location information detecting part. As anther example, the detector 14 can employ a photosensor.

Either the operating member 12 or the holding member 30 is supported by a portion of the housing 17 and is displaceable with respect to the housing 17. In the second embodiment, for example, the operating member 12 is supported by the wall 20*a* of the cover 20 of the housing 17.

Next, a returning operation for returning the operating member 12 to the stationary position by the actuator 15 will be described. Here, a description will be made mainly using a structure of the core 50 as an example.

In the non-energized state of the coils 41, 51, the cores 40, 50 are magnetized by the magnetic fields produced between the magnets 43, 44 and the magnets 53, 54, respectively, similar to FIGS. 5A and 5B. Thus, the cores 40, 50 serve as magnets. The attracting magnetic forces are produced between the end surfaces of the cores 40, 50 and the opposed surfaces of the magnets 43, 44, 53, 54.

Similar to the first embodiment, the direction and the magnitude of the electric currents supplied to the coils 41, 51 are determined such that the magnetic forces between the end surfaces of the cores 40, 50 and the opposed surfaces of the magnets 43, 44, 53, 54 are in the range of the attracting magnetic forces. Thus, as the electric currents are supplied to the coils 41, 51, the attracting magnetic forces are exerted between the end surfaces of the cores 40, 50 and the opposed surfaces of the magnets 43, 44, 53, 54.

Figure 11A:
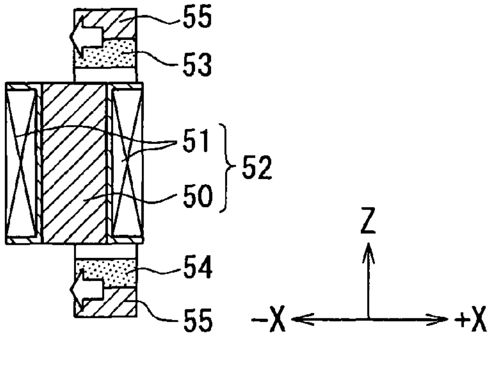
FIG. 11A is a schematic view for explaining a restoring force created by an actuator of the input unit, when an operating member is moved in a +X direction, according to the second embodiment.

Referring to FIG. 11A, for example, when the operating member 12 is operated in the +X direction, the magnets 53, 54 and the yoke 55 are displaced with the operating member 12. Irrespective of the energized state and the non-energized state of the coil 51, the attracting magnetic forces are exerted between the core 50 and the magnets 53, 54. Thus, the magnetic forces to return the magnets 53, 54 to stationary positions are exerted, as shown by solid line arrows in FIG. 11A. As a result, the magnets 53, 54 and the yoke 55 are automatically returned to the stationary condition. That is, the operating member 12 is automatically returned to the stationary position.

Figure 11B:
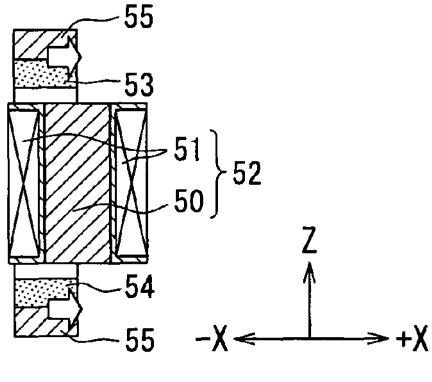
FIG. 11B is a schematic view for explaining a restoring force created by the actuator, when the operating member is moved in a −X direction, according, to the second embodiment.

As shown in FIG. 11B, for example, when the operating member 12 is operated in the −X direction, the magnets 53, 54 and the yoke 55 are displaced with the operating member 12. Irrespective of the energized state and the non-energized state of the coil 51, the attracting magnetic forces are exerted between the core 50 and the magnets 53, 54. Thus, the magnetic forces to return the magnets 53, 54 to the stationary positions are exerted, as shown by solid line arrows in FIG. 11B. As a result, also in this case, the magnets 53, 54 and the yoke 55 are automatically returned to the stationary condition. That is, the operating member 12 is returned to the stationary position.

In the above example, the operating member 12 is exemplarily operated in the +X direction and the −X direction. Also in the cases where the operating member 12 is operated in any other directions such as in the direction of the Y axis and in oblique directions and rotated about the Z axis, the operating member 12 is automatically returned to the stationary position in the similar manner.

In the second embodiment, the magnetic force of the actuator 15 is employed to return the operating member 12 to the stationary position. Therefore, the restoring force generating member 13 can be omitted. Accordingly, the structure of the input device 10 is simplified.

It is noted that a magnetic force (Coulomb force) is inversely proportional to the square of distance. Namely, the magnetic force reduces with an increase in the amount of displacement of the operating member 12, that is, the distance from the stationary position. Therefore, the controller 16 can be configured to vary the amount of electric currents to the coils 41, 51 in accordance with the amount of operation of the operating member 12.

Third Embodiment

Figure 12:
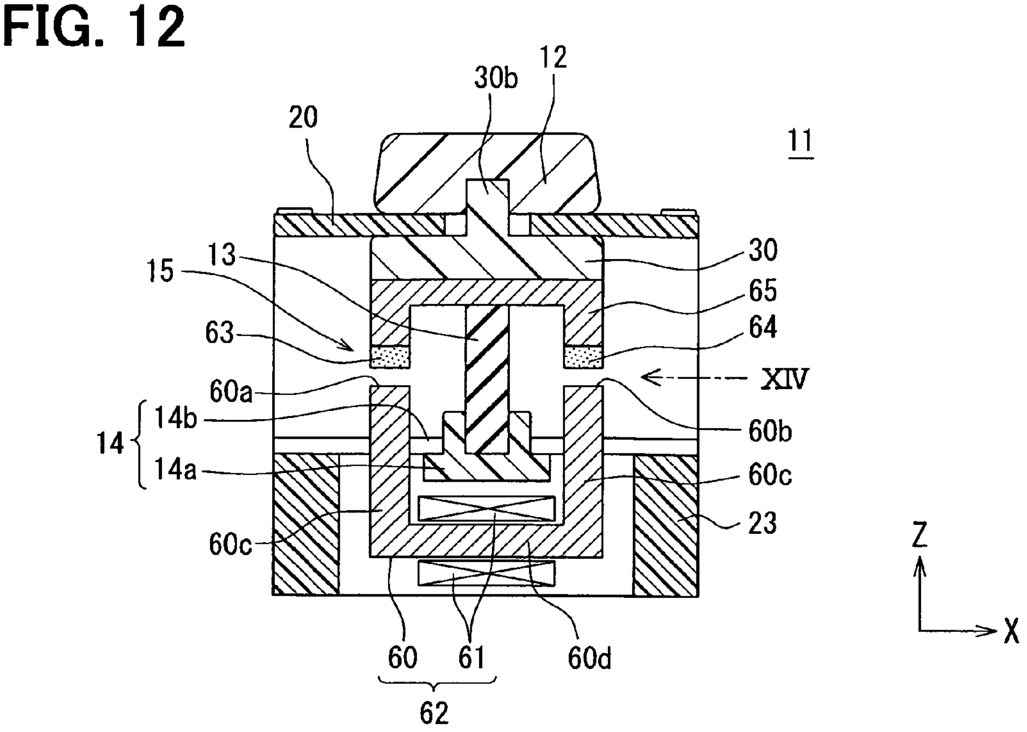
FIG. 12 is a schematic cross-sectional view of an input unit of an input device according to a third embodiment of the present invention.

Next, an input device according to the third embodiment will be described with reference to FIGS. 12 to 14A. In the input device 10 according to the third embodiment, as shown in FIG. 12, the input unit 11 has a single electromagnet 62 and a pair of magnets 63, 64. Other structures are generally the same as the input device 10 of the first embodiment.

Similar to the electromagnets 42, 52 of the first and second embodiments, the electromagnet 62 has one core 60 and a coil 61 wound around the core 60. The core 60 has end surfaces 60*a*, 60*b* parallel to the XY plane. The core end surfaces 60*a*, 60*b* are located on opposite sides of the rotation axis 12*d*, at least in the stationary condition where the operating member 12 is at the stationary position.

Figure 14A:
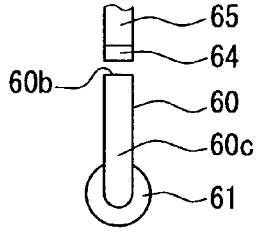
FIG. 14A is a schematic side view of an electromagnet of the actuator, when viewed along an arrow XIV in FIG. 12.

For example, the core 60 has a generally U-shape including side portions 60*c* and a connecting portion 60*d*. The side portions 60*c* extend in the direction of Z axis. For example, the side portions 60*c* extend straightly in the direction of Z axis, as shown in FIG. 14A. The side portions 60*c* are located on opposite sides of the rotation axis 12*d*. The connecting portion 60*d* extends parallel to the XY plane and connects the side portions 60*c*.

The core end surfaces 60*a*, 60*b* are located at the same position with respect to the direction of the Z axis. In the stationary condition where the operating member 12 is at the stationary position, the core end surfaces 60*a*, 60*b* are equidistant from the rotation axis 12*d*, with respect to the direction parallel to the XY plane. The coil 61 is wound around the connecting portion 60*d*. Similar to the first and second embodiments, the electromagnet 62 is fixed to the case 23 of the housing 17.

The magnet 63 is arranged to oppose the core end surface 60*a*. The magnet 64 is arranged to oppose the core end surface 60*b*. The magnets 63, 64 are permanent magnets. The magnets 63, 64 are fixed to the holding member 30 through a yoke 65. The magnets 63, 64 are capable of being displaced with the operating member 12.

Figure 13:
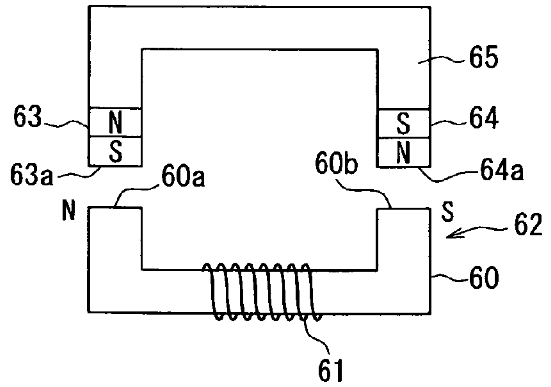
FIG. 13 is a schematic view of an actuator of the input unit according to the third embodiment.

As shown in FIG. 13, an opposed surface 63*a* of the magnet 63, which is opposed to the core end surface 60*a*, and an opposed surface 64*a* of the magnet 64, which is opposed to the end surface 60*b*, are parallel to the XY plane. Also, a distance between the opposed surface 63*a* and the core end surface 60*a* is equal to a distance between the opposed surface 64*a* and the core end, surface 60*b* in the stationary condition.

The opposed surface 63*a* and the opposed surface 64*a*, have opposite polarities. For example, the opposed surface 63*a* has the south pole and the opposed surface 64*a* has the north pole. Therefore, in the non-energized state where the coil 61 is not supplied with an electric current, the core 60 is magnetized by the magnets 63, 64 such that the core end surface 60*a* has the north pole and the core end surface 60*b* has the south pole.

When the coil 61 is supplied with the electric current, the core 60 is magnetized by the magnetic field produced by the magnets 63, 64 and a magnetic field produced by the electric current passing through the coil 61. Also in the third embodiment, the electric current is supplied to the coil 61 such that the magnetic forces between the core end surfaces 60*a*, 60*b* and the opposed surfaces 63*a*, 64*a* are the attracting magnetic forces.

A surface of the magnet 63, which is opposite to the opposed surface 63*a*, contacts an end of the yoke 65. A surface of the magnet 64, which is opposite to the opposed surface 64, contacts an opposite end of the yoke 65. In such a structure, power consumption reduces. Also, leakage of the magnetic field is reduced, and thus reduces malfunctions of other devices.

In the third embodiment, since the input unit 11 has the single electromagnet 62, that is, one core 60, the structure of the electromagnet 62 is simplified and thus manufacturing costs of the input device 10 is reduced.

The coil 61 is wound around the connecting portion 60*d* of the U-shaped core 60. That is, the coil 61 is not wound around the side portions 60*c*. Therefore, a size of the input unit 11 is reduced with respect to a direction in which the end surfaces 60*a*, 60*b* are aligned, that is, in a direction parallel to the XY plane.

Figure 14B:
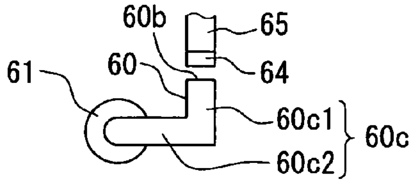
FIG. 14B is a schematic side view of an electromagnet of an actuator according to another example of the third embodiment.

The shape of the core 60 is not limited to the above-described shape. In the example shown in FIG. 14A, the side portions 60*c* extend straightly in the direction of Z axis. As another example, the side portions 60*c* can have a generally L-shape, as shown in FIG. 14B.

Specifically, each of the side portions 60*c* has a first portion 60*c*1 and a second portion 60*c*2. The first portion 60*c*1 includes the end surface 60*b* at an end and thereof extends in the direction of the Z axis. The second portion 60*c*2 extends perpendicularly from an opposite end of the first portion 60*c*1, and connects to the connecting portion 60*d*. The second portion 60*c*2 extends in the direction of the XY plane. In such a structure, the coil 61 is still wound around the connecting, portion 60*d*, and the size of the input unit 11 in the direction of the Z axis is reduced.

Figure 15:
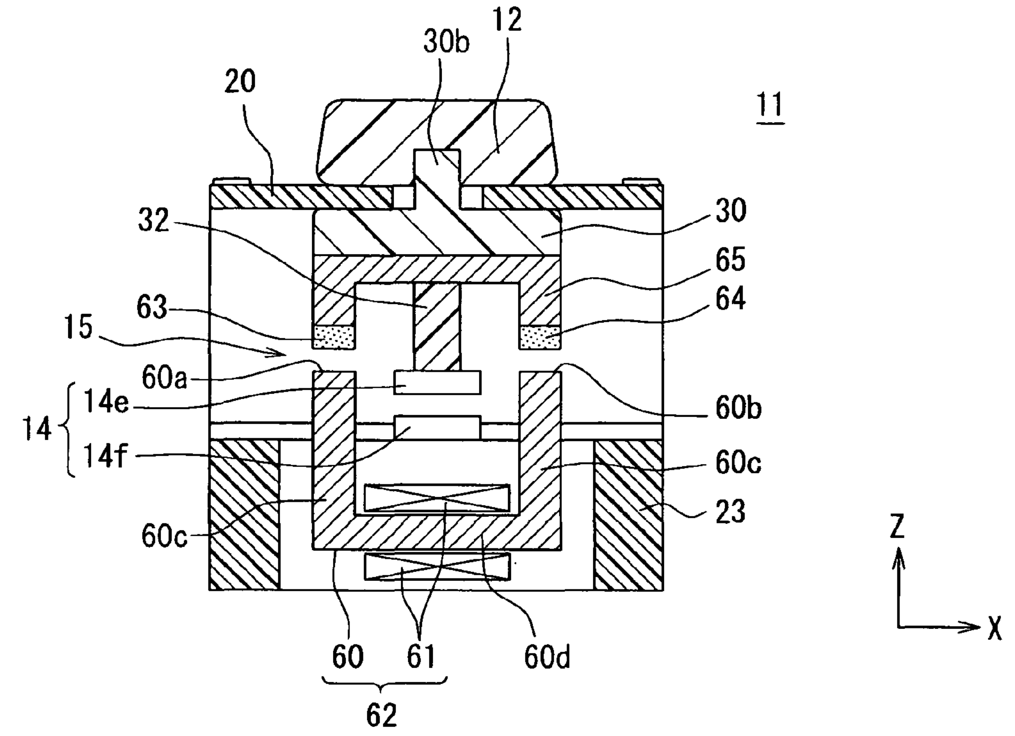
FIG. 15 is a schematic sectional view of an input unit of an input device according to a modified embodiment of the present invention.

Further, the structure of the third embodiment can be combined with the structure of the second embodiment, as shown in FIG. 15. That is, in the input unit 11 having the single electromagnet 62, the actuator 15 can be configured to have the function of the restoring force generating member 13.

In the example shown in FIG. 15, the detector 14 is a non-contact position information detecting part including a reflection member 14*e* for reflecting a light and a photosensor 14*f* having an element for radiating the light and an element for receiving the light.

In such a structure, the elastically deformable member as the restoring force generating member 13 is omitted. Therefore, the structure of the input device 10 is simplified.

Various exemplarily embodiments of the present invention are described hereinabove. However, the present invention is not limited to the above-described exemplarily embodiments, but may be implemented in various other ways without departing from the spirit of the invention. Further, the present invention may be implemented by combining the embodiments in various ways.

Figure 16:
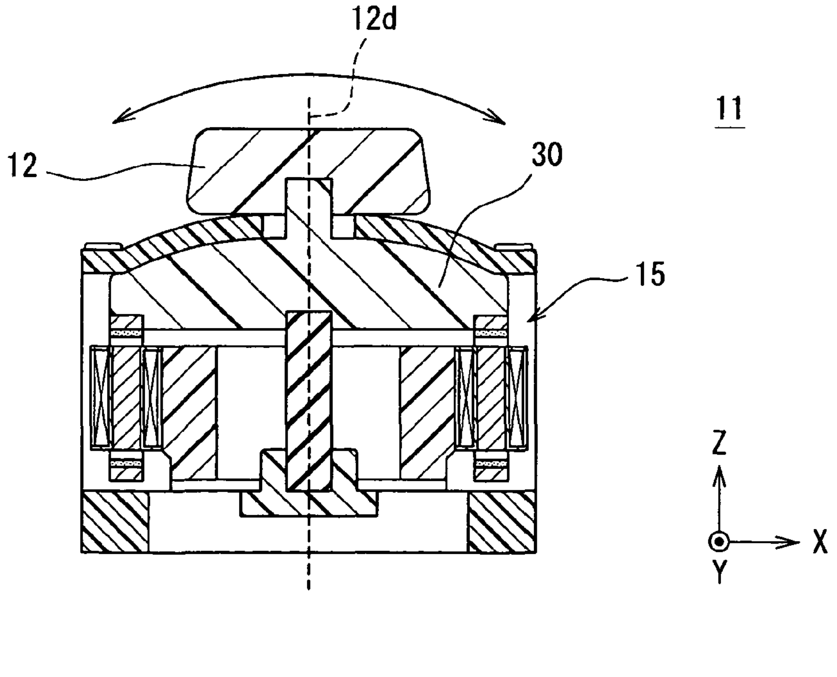
FIG. 16 is a schematic sectional view of an input unit of an input device according to another modified embodiment of the present invention.

In the above-described embodiments, the operating member 12 is configured to be operated in directions along the wall 20*a* of the cover 20. That is, the operating member 12 is translated parallel to the XY plane. The present invention can be employed to the operating member 12 that is operated in a rocking manner, as shown in FIG. 16. Also in this case, the operated member 12 can be displaced in any directions along the XY plane.

In the structure of FIG. 16, the holding member 30 has a spherical surface on a side adjacent to the wall 20*a*, and the magnets and the cores are arranged parallel to the spherical surface. In this, way, the displacement of the operating member 12 includes the rocking movement, in addition to the parallel translation along the XY plane. Thus, the flexibility of the design of the input device 10, especially, the input unit 11, improves. Further, it can be designed to suit with an operation feeling of the user.

In the above-described embodiments, the magnets 43, 44, 53, 54, 63, 64 of the actuator 15 are arranged to be displaced with the displacement of the operating member 12. On the other hand, it may be possible to configure such that the electromagnets 42, 52, 62 are displaced with the displacement of the operating member 12.

Figure 19:
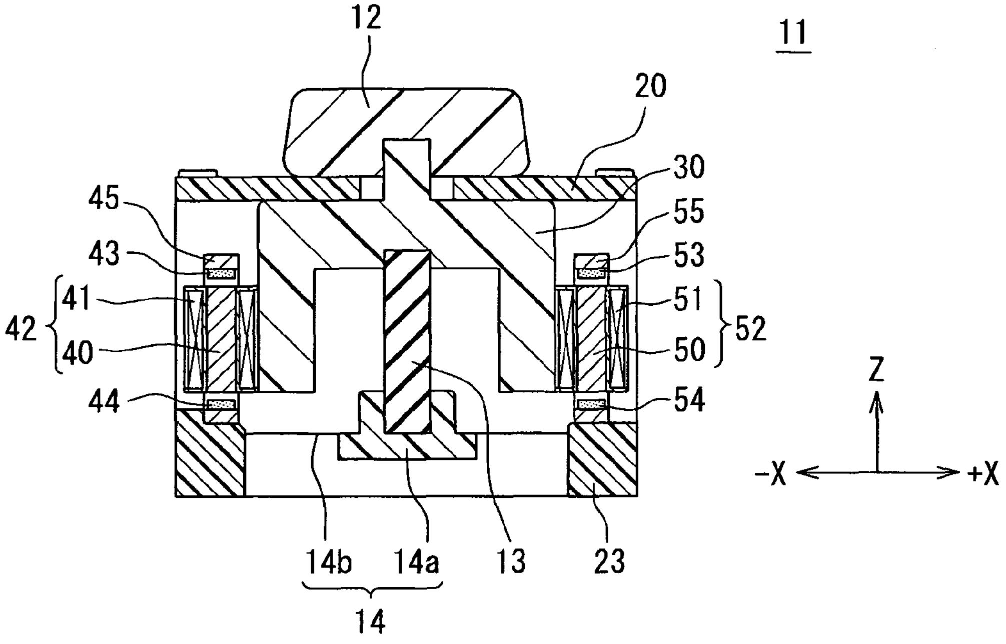
FIG. 19 is a schematic cross-sectional view of an input unit of an input device according to yet another modified embodiment of the present invention.

FIG. 19 shows an example where the electromagnets 42, 52 are arranged to be displaceable with the displacement of the operating member 12. For example, the electromagnets 42, 52 are fixed to the holding member 30, and the yokes 45, 55 to which the magnets 43, 44, 53, 54 are fixed are fixed to the case 23. Namely, either the magnets 43, 44, 53, 54, 63, 64 or the electromagnets 42, 52, 62 are configured to be displaced with the displacement of the operating member 12.

In the above-described embodiments, the magnets 43, 44, 53, 54, 63, are exemplarily the permanent magnets. As another example, electromagnets can be employed as the magnets 43, 44, 53, 54, 63, 64. For example, in a structure where the actuator 15 has the function of the restoring force generating member 13, coils of the electromagnets as the magnets 43, 44, 53, 54, 63, 64 are energized to generate attracting magnetic forces, under a condition where the operating member 12 can be operated, such as when an ignition key of a vehicle is on.

In a structure where the restoring force generating member 13 is provided as a member separate from the actuator 15, the coils of the electromagnets as the magnets 43, 44, 53, 54, 63, 64 can be energized and non-energized at the same timing as the energization and non-energization of the coils 41, 51, 61.

In the above-described embodiments, the end surfaces of the cores 40, 50, 60 of the electromagnets 42, 52, 62 and the opposed surfaces of the magnets 43, 44, 53, 54, 63, 64 are parallel to the XY plane. However, a structure where the end surfaces of the core 40, 50, 60 and the opposed surfaces of the magnets 43, 44, 53, 54, 63, 64 are parallel to the XY plane can be concerned. For example, the end surfaces of the cores 40, 50 and the opposed surfaces 43, 53 can be perpendicular to the XY plane.

Figure 17:
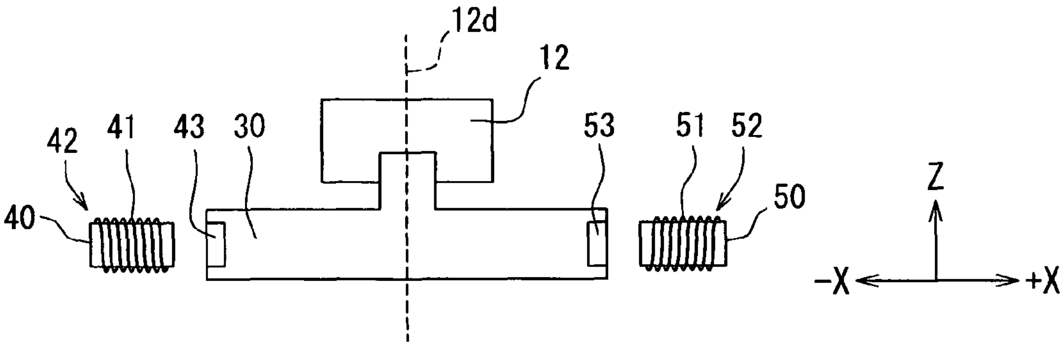
FIG. 17 is a schematic diagram for showing arrangement between magnets and electromagnets of an input Unit of an input device according to further another modified embodiment of the present invention.

In an example shown in FIG. 17, the cores 40, 50 and the magnets 43, 53 are arranged along the X axis. The end surface of the core 40, the opposed surface of the magnet 43 are located on the −X axis side relative to the rotation axis 12*d* and are perpendicular to the XY plane. The end surface of the core 50 and the opposed surface of the magnet 53 are located on the +X axis side relative to the rotation axis 12*d* and are perpendicular to the XY plane.

In such a structure, however, if the operating member 12 is displaced in a direction in which the end surfaces of the cores 40, 50 and the opposed surfaces of the magnets 43, 53 are opposed, such as in a direction along the X axis, a distance between the opposed surface of one of the magnets 43, 53 and the end surface of the corresponding core 40, 50 is reduced and a distance between the opposed surface of the other of the magnets 43, 53 and the end surface of the corresponding core 40, 50 is increased.

For example, if the operating member 12 is displaced in the direction of the −X axis, a distance between the end surface of the core 40 and the opposed surface of the magnet 43 is reduced and a distance between the end surface of the core 50 and the opposed surface of the magnet 53 is increased. Since the magnetic force, that is, the Coulomb force is inversely proportional to the square of the distance, the magnetic force on the side where the distance is reduced is increased. Therefore, it is necessary to independently control the electric current between the coils 41, 51, to provide a reverse tactile feeling with respect to the operation direction.

In the above-described embodiments, on the other hand, the end surfaces of the cores 40, 50, 60 and the opposed surfaces of the magnets 43, 44, 53, 54, 63, 64 are parallel to the XY plane, and the operating member 12 is moved parallel to the XY plane. Therefore, it is not necessary to independently control the electric currents to the coils 41, 51. In this case, the reverse tactile feeling can be provided even by using the same drive signal, that is, even if the direction and the magnitude of the electric current are the same between the coils 41, 51.

Figure 18:
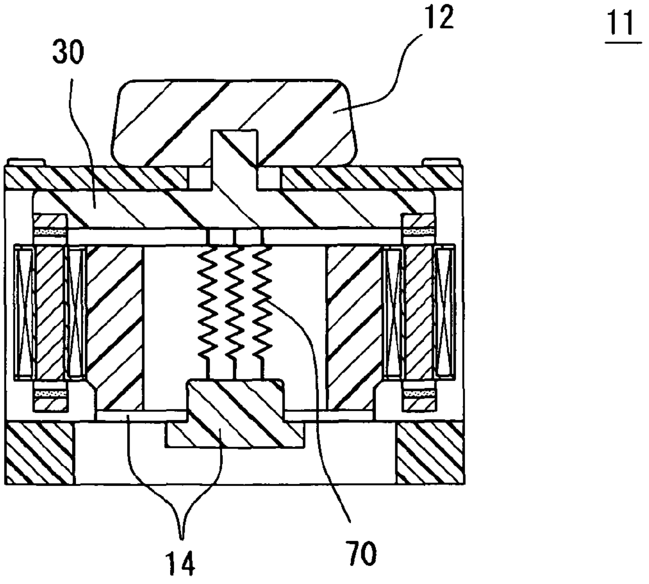
FIG. 18 is a schematic sectional view of an input unit of an input device according to still another modified embodiment of the present invention.

In the first and second embodiments, the restoring force generating member 13 is made of the rubber member. However, the restoring force generating member 13 can be made of any other elastic members, which are machined or formed to have elasticity. As shown in FIG. 18, for example, the input unit 11 has a restoring force generating member 70 including metallic springs, in place of the restoring force generating member 13. In the case of the rubber, hardness varies with the temperature. Therefore, the tactile feeling may change with the temperature. In the case of the metallic springs, elasticity hardly changes, with the temperature. Therefore, it is less likely that the tactile feeling will be varied with the temperature.

In the above-described embodiments, to apply the external force to the operating member 12 along the operation direction, the attracting magnetic forces are exerted between the magnets 43, 44, 53, 54, 63, 64 and the cores 40, 50, 60. As another example, it may be possible to configure such that repelling magnetic forces are exerted therebetween. Also in such a case, the external force along the operation direction can be applied. Specifically, an external force in the same direction as the operation direction can be applied. Because an accelerating feeling can be provided, a favorable tactile feeling can be achieved. As such, the confirmation of the operation improves.

However, in the structure where the actuator 15 has the function of the restoring force generating member 13, the attracting magnetic forces are at least used as the magnetic forces exerted between the magnets 43, 44, 53, 54, 63, 64 and the cores 40, 50, 60.

If the attracting magnetic forces are used rather than the repelling magnetic forces, the inverse external force is applied to the operating member 12 with respect to the force applied by the user. Therefore, the user can easily confirm his/her operation of the operating member 12. In the case where the permanent magnets are used as the magnets 43, 44, 53, 63, 64, it is configured such that the magnetic forces in the energized state are greater than the magnetic forces in the non-energized state. In such a case, the user can further easily confirm his/her, operation of the operating member 12.

Additional advantages and modifications will readily occur to those skilled in the art. The invention in its broader term is therefore not limited to the specific details, representative apparatus, and illustrative examples shown and described.

What is claimed is:

1. An input device comprising:

an operating member to be operated by a user, the operating member supported to be displaceable in directions along a XY plane including an X axis and a Y axis relative to a stationary position defined at an intersection of the X axis and the Y axis and rotatable about a Z axis;

a restoring force generating part configured to generate a force to automatically return the operating member to the stationary position;

a detector configured to detect an operation state of the operating member;

an actuator configured to apply an external force to the operating member, the actuator including an electromagnet, a first magnet and a second magnet, the electromagnet having a core made of a magnetic material and a coil integrated with the core; and a controller configured to control an electric current to the coil in accordance with a detection result of the detector, thereby to control an operation of the actuator;

a housing including a case and a cover;

a holding member, wherein the holding member is located adjacent to a second surface of the cover, the holding member connects to the operating member through a through hole of the cover and is movable with the operating member, the restoring force generating part is configured to generate the force as a reaction force of elastic deformation, in a static condition, where the operating member is at the stationary position, the restoring force generating part extends along the Z axis, and an axis of the restoring force generating part coincides with an axis of rotation of the operating member, the restoring force generating part has a first end fixed to the holding member on a side of the holding member opposite to the operating member, the detector includes a holder and a plurality of strain gauzes, a second end of the restoring force generating part opposite to the holding member is fixed to the holder, the plurality of strain gauzes are arranged radially about the holder on a plane parallel to the XY plane, the plurality of strain gauzes are configured to detect displacement of the operating member in directions parallel to the XY plane and rotation of the operating member, the operating member is supported by the case through the holding member, the restoring force generating part, the holder, and the plurality of strain gauzes, the holding member is configured such that when the operating member is operated, the holding member is moved with the operating member, the restoring force generating part is configured to deform when the operating member is operated such that a resistance value of the plurality of strain gauzes changes, one of the electromagnet and the first and second magnets is integrated with the operating member, and the other of the electromagnet and the first and second magnets is integrated with the case, at least in the stationary condition, the first magnet and the second magnet are located on opposite sides of the axis of rotation of the operating member, the first magnet has a first opposed surface defining one of magnetic poles, the second magnet has a second opposed surface defining one of magnetic poles, in the stationary condition, the first opposed surface and the second opposed surface are opposed to a first end surface and a second end surface of the core across predetermined clearances, respectively.

2. The input device according to claim 1, wherein the restoring force generating part is included in the actuator.

3. The input device according to claim 1, wherein the operating member is supported to be displaceable in directions parallel to the XY plane, and the first and second end surfaces of the core and the first and second opposed surfaces of the first and second magnets are parallel to the XY plane.

4. The input device according to claim 3, wherein the actuator further includes a third magnet and a fourth magnet, the third magnet and the fourth magnet are located on opposite sides of the axis of rotation of the operating member at least in the stationary condition, the third magnet is aligned with the first magnet with respect to a direction perpendicular to the XY plane, the fourth magnet is aligned with the second magnet with respect to a direction perpendicular to the XY plane, the core is a first core, the first end surface is defined at an end of the first core, the actuator further includes a second core, the second end surface is defined at an end of the second core, the first core is located between the first magnet and the third magnet such that the first end surface is opposed to the first opposed surface of the first magnet and an end surface of the first core opposite to the first end surface is opposed to the third opposed surface of the third magnet, the third opposed surface has a magnetic pole opposite to the magnetic pole of the first opposed surface, the second core is located between the second magnet and the fourth magnet such that the second end surface is opposed to the second opposed surface of the second magnet and an end surface of the second core opposite to the second end surface is opposed to the fourth opposed surface of the fourth magnet, and the fourth opposed surface has a magnetic pole opposite to the magnetic pole of the second opposed surface.

5. The input device according to claim 4, wherein the actuator further includes a first yoke and a second yoke each having a loop shape and made of a magnetic material, the first magnet and the third magnet are fixed to opposite inner surfaces of the first yoke, and the second magnet and the fourth magnet are fixed to opposite inner surfaces of the second yoke.

6. The input device according to claim 1, wherein the first opposed surface and the second opposed surface have opposite magnetic poles.

7. The input device according to claim 6, wherein the core has a substantially U-shape including side portions and a connecting portion connecting the side portions, the coil is integrated with the connecting portion, and the first and second end surfaces of the core are defined at ends of the side portions opposite to the connecting portions.

8. The input device according to claim 1, wherein the first and second magnets are permanent magnets.

9. The input device according to claim 8, wherein the actuator further includes at least one yoke made of a magnetic material, and at least one of the first magnet and the second magnet is integrated with the yoke and contacts the yoke.

10. The input device according to claim 1, wherein the restoring force generating part includes an elastically deformable member, an end of the elastically deformable member is connected to the operating member to be elastically deformed in accordance with a displacement and a rotation of the operating member, thereby to generate a restoring force for returning the operating member to the stationary position, and an opposite end of the elastically deformable member is connected to the detector.

11. The input device according to claim 1, wherein the restoring force generating part includes a spring, an end of the spring is connected to the operating member, and an opposite end of the spring is connected to the detector.

12. The input device according to claim 1, to be intended to input information to a display screen of a display device for a vehicle.

* * * * *